US009426804B2

(12) United States Patent
Ohta et al.

(10) Patent No.: US 9,426,804 B2
(45) Date of Patent: Aug. 23, 2016

(54) RADIO RESOURCE SETTING METHOD, BASE STATION, RADIO RESOURCE SETTING SYSTEM, AND NON-TRANSITORY COMPUTER READABLE MEDIUM

(71) Applicant: NEC Corporation, Minato-ku, Tokyo (JP)

(72) Inventors: Daisuke Ohta, Tokyo (JP); Takahiro Nobukiyo, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 14/440,649

(22) PCT Filed: Jun. 24, 2013

(86) PCT No.: PCT/JP2013/003932
§ 371 (c)(1),
(2) Date: May 5, 2015

(87) PCT Pub. No.: WO2014/073132
PCT Pub. Date: May 15, 2014

(65) Prior Publication Data
US 2015/0289263 A1  Oct. 8, 2015

(30) Foreign Application Priority Data

Nov. 9, 2012  (JP) ................................ 2012-246962

(51) Int. Cl.
| H04W 4/00 | (2009.01) |
| H04W 72/04 | (2009.01) |
| H04W 16/04 | (2009.01) |
| H04W 24/08 | (2009.01) |
| H04W 84/04 | (2009.01) |
| H04W 28/16 | (2009.01) |

(52) U.S. Cl.
CPC ......... *H04W 72/0446* (2013.01); *H04W 16/04* (2013.01); *H04W 24/08* (2013.01); *H04W 28/16* (2013.01); *H04W 84/042* (2013.01)

(58) Field of Classification Search
None
See application file for complete search history.

(56) References Cited

U.S. PATENT DOCUMENTS

| 2013/0023276 A1* | 1/2013 | Du ......................... H04B 7/024 455/452.1 |
| 2013/0259022 A1* | 10/2013 | Jitsukawa ......... H04W 72/1273 370/342 |
| 2014/0004863 A1* | 1/2014 | Zhang ............... H04W 36/0033 455/444 |

FOREIGN PATENT DOCUMENTS

| JP | 2012-129793 A | 7/2012 |
| JP | 2012-249106 A | 12/2012 |
| WO | 2012/105391 A1 | 8/2012 |

OTHER PUBLICATIONS

Bin Fan et al., "A Dynamic Resource Allocation Scheme Based on Soft Frequency Reuse for OFDMA Systems", IEEE 2007 International Symposium on Microwave, Antenna, Propagation and EMC Technologies for Wireless Communications, pp. 121-125, Aug. 2007.

(Continued)

*Primary Examiner* — Minh-Trang Nguyen

(57) ABSTRACT

The method is a method of setting radio resources which a pico base station (100) and a macro base station (200) can use for wireless communication with a terminal, and includes obtaining loads the pico base station (100) and the macro base station (200), calculating a first delay index of the pico base station using the load of the pico base station (100), calculating using the load of the macro base station (200) a second delay index of the macro base station (200) in case where the macro base station (200) has set radio resources whose use is limited, and calculating a ratio of the radio resources whose use is limited by the macro base station (200) based on the first and second delay indices, and setting the radio resources whose use is limited in the second communication area using the ratio of the radio resources whose use is limited.

25 Claims, 15 Drawing Sheets

(56) References Cited

OTHER PUBLICATIONS

3GPP TS 36.423 V9.0.0 (Aug. 2009), 3GPP TSG RAN E-UTRAN X2AP, pp. 16-17, p. 29, p. 49, Sep. 2009.

3GPP TS 36.300 V10.6.0 (Dec. 2011), 3GPP TSG RAN E-Utra and E-Utran Overall description Stage 2 (Release 10), p. 116, Dec. 2011.
International Search Report for PCT Application No. PCT/JP2013/003932, mailed on Oct. 1, 2013.

* cited by examiner

RADIO RESOURCE SETTING METHOD, BASE STATION, RADIO RESOURCE SETTING SYSTEM, AND NON-TRANSITORY COMPUTER READABLE MEDIUM

This application is a National Stage Entry of PCT/JP2013/003932 filed on Jun. 24, 2013, which claims priority from Japanese Patent Application 2012-246962 filed on Nov. 9, 2012, the contents of all of which are incorporated herein by reference, in their entirety.

TECHNICAL FIELD

The present invention relates to an allocation radio resource setting method and, more particularly, relates to an allocation radio resource setting method of suppressing an interference with a neighboring cell.

BACKGROUND ART

A wireless communication system such as LTE (Long Term Evolution) standardized by 3GPP (Third Generation Partnership Project) assumes that a plurality of base stations are located. Each base station used for the wireless communication system communicates with terminals (mobile stations) in a communication area (referred to as a cell below) of each base station. Further, a base station can divide a cell into a plurality of regions when an antenna has directionality. These divided regions are referred to as sector cells. Cells described below include not only normal cells but also sector cells.

According to LTE, the same communication band is usually used between neighboring cells. Hence, a terminal (referred to as an edge terminal below) positioned at a boundary between cells receives a strong interference from a neighboring cell irrespectively of in uplink or in downlink. To deal with such a problem, an interference management technique which is called ICIC (Inter Cell Interference Coordination) and suppresses an interference between neighboring cells by setting a priority band which enables a terminal in a corresponding cell to preferentially perform communication, and, in each cell, limiting allocation radio resources of a priority band of a neighboring cell for a terminal is known. It is conceived that radio resources are limited by excluding a priority band from an allocation target or reducing transmission power of this priority band when the priority band is notified from the neighboring cell.

As a method of setting a priority band, a technique which is called FFR (Fractional Frequency Reuse) and performs fractional frequency reuse such that a priority band does not overlap between cells is known (Non-Patent Literature 1). Further, as a priority band notifying method, LOAD INFORMATION is standardized according to LTE. For example, RNTP (Relative Narrowband TX Power) is defined in downlink of LTE, and HII (High Interference Indication) is defined in uplink (Non-Patent Literature 2).

Further, as a counter measure for an increase in a traffic amount in recent years, a heterogeneous network in which cells of various sizes are provided by introducing base stations (small cell base stations) of low transmission power in hot spots in addition to conventional macro base stations in a mixed fashion is gaining attention. However, a cell boundary area expands as the number of cells increases, and therefore an inter-cell interference is regarded as a problem.

According to 3GPP Release 10, eICIC (enhanced ICIC) has been studied as an interference management technique, and an ABS (Almost Blank Subframe) has been standardized (Non-Patent Literature 3). eICIC is also referred to as time domain ICIC, and a base station which has set ABSs stops transmission in the ABSs through a control channel (PDCCH: Physical Downlink Control Channel) and a data channel (PDSCH: Physical Downlink Shared Channel) in downlink. A subframe is a radio resource allocation unit time. Thus, the SINR of a terminal in a neighboring cell substantially improves in the ABS, and an increase in throughputs of terminals is expected.

CITATION LIST

Non Patent Literature

NPL 1: Bin Fan et al., "A Dynamic Resource Allocation Scheme Based on Soft Frequency Reuse for OFDMA Systems", IEEE 2007 International Symposium on Microwave, Antenna, Propagation and EMC Technologies for Wireless Communications, pp. 121-125, August 2007

NPL 2: 3GPP TS 36.423 V9.0.0 (2009-09), 3GPP TSG RAN E-UTRAN X2AP, pp. 16-17, p. 29, p. 49, September 2009

NPL 3: 3GPP TS 36.300 V10.6.0 (2011-12), 3GPP TSG RAN E-UTRA and E-UTRAN Overall description Stage 2 (Release 10), p. 116, December 2011

SUMMARY OF INVENTION

Technical Problem

A macro base station which has set ABSs cannot allocate radio resources in the ABSs. Therefore, the throughputs of terminals of the macro base station deteriorate. Therefore, there is a problem that, when an ABS ratio is a fixed value, fairness between throughputs of all terminals of a wireless communication system is substantially lost.

FIG. 14 illustrates a 5% value of throughputs of macro terminals, pico terminals and all terminals before eICIC is applied and when eICIC is applied to three patterns of ABS ratios.

When the ABS ratio with respect to traffic loads of the macro base station and the pico base station before eICIC is applied is too small, throughputs of pico terminals hardly improve. Meanwhile, when the ABS ratio is too large, the throughputs of the terminals of the pico base station improve. However, the throughputs of the terminals of the macro base station substantially deteriorate, and therefore a balance between the throughputs of the terminals of the macro base station and the pico base station is lost. Particularly when throughputs of edge terminals of the macro base station deteriorate, the 5% value of the throughputs of all terminals deteriorates. Therefore, the fairness between the throughputs of the terminals is lost.

To solve the above problem, an object of the present invention is to provide a radio resource setting method, a base station, a radio resource setting system and a program which can improve fairness between throughputs of all terminals.

Solution to Problem

A radio resource setting method according to a first aspect of the present invention is a radio resource setting method for, when there are a first communication area managed by a first base station and a second communication area including at least part of the first communication area and managed by a second base station, setting radio resources that the first and second base stations can use for wireless communication with a terminal, and includes: obtaining loads of the first communication area and the second communication area; calculating a first delay index of the first communication area using the load of the first communication area; calculating using the load of the second communication area a second delay index of the second communication area in case where the radio resources whose use is limited in the second communication area have been set; calculating a ratio of radio resources whose use is limited in the second communication area based on the first delay index and the second delay index; and setting the radio resources whose use is limited in the second communication area using the ratio of the radio resources whose use is limited.

A base station according to a second aspect of the present invention is a base station that performs wireless communication with a terminal in a second communication area that is at least one of a neighboring communication area of a first communication area or a communication area including part of the first communication area, and includes: a load measuring unit that measures a load of the second communication area; and an allocation radio resource setting unit that calculates a first delay index of the first communication area using the load of the first communication area notified from an other base station that manages the first communication area, calculates using the load of the second communication area a second delay index of the second communication area in case where the radio resources whose use is limited in the second communication area have been set, and calculates a ratio of radio resources whose use is limited in the second communication area based on the first delay index and the second delay index.

A radio resource setting system according to a third aspect of the present invention is a radio resource setting system that, when there are a first communication area managed by a first base station and a second communication area including at least part of the first communication area and managed by a second base station, sets radio resources that the first and second base stations can use for wireless communication with a terminal, and is configured to: obtain loads of the first communication area and the second communication area; calculate a first delay index of the first communication area using the load of the first communication area; calculate using the load of the second communication area a second delay index of the second communication area in case where the radio resources whose use is limited in the second communication area have been set; calculate a ratio of the radio resources whose use is limited in the second communication area based on the first delay index and the second delay index; and set the radio resources whose use is limited in the second communication area using the ratio of the radio resources whose use is limited.

A program according to a fourth aspect of the present invention is a program that is executed by a computer of a base station that performs wireless communication with a terminal in a second communication area that is at least one of a neighboring communication area of a first communication area or a communication area including part of the first communication area, and causes the computer to execute: obtaining a load of the second communication area; calculating a first delay index of the first communication area using a load of the first communication area notified from an other base station that manages the first communication area; calculating using the load of the second communication area a second delay index of the second communication area in case where the radio resources whose use is limited in the second communication area have been set; and calculating a ratio of the radio resources whose use is limited in the second communication area based on the first delay index and the second delay index.

Advantageous Effects of Invention

The present invention can provide a radio resource setting method, a base station, a radio resource setting system and a program which can improve fairness between throughputs of all terminals.

DESCRIPTION OF EMBODIMENTS

First Embodiment

ABS Ratio is Updated by Predetermined Step According to Load

Next, an embodiment of the present invention will be described in detail with reference to the drawings.

[Explanation of Configuration]

Figure 1:
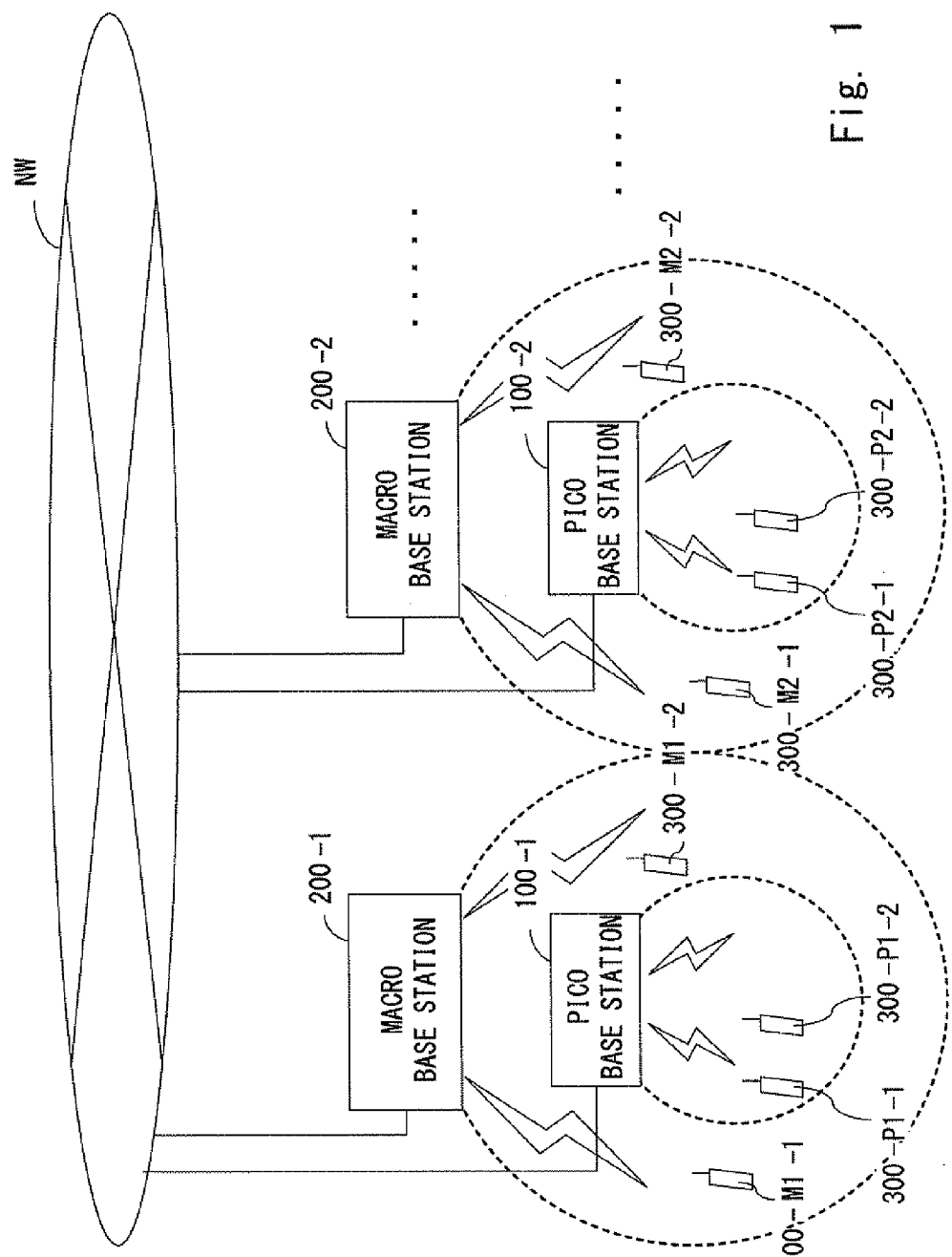
FIG. 1 is a configuration diagram of a wireless communication system according to a first embodiment.

FIG. 1 illustrates a configuration of a wireless communication system 10 according to the first embodiment of the present invention. The present invention is applied to downlink of LTE in the wireless communication system 10. The wireless communication system 10 includes pico base stations 100-1 and 100-2, macro base stations 200-1 and 200-2, and a plurality of terminals 300-P1-1, 300-P1-2, 300-P2-1, 300-P2-2, 300-M1-1, 300-M1-2, 300-M2-1 and 300-M2-2. An example where the wireless communication system 10 includes two macro base stations and two pico base stations will be described with reference to FIG. 1. However, the wireless communication system 10 may include two or more base stations. Further, the wireless system communication 10 may include a greater number of terminals than the number of terminals illustrated in FIG. 1. M represents an initial letter of Macro, and P represents an initial letter of Pico. In this regard, a terminal 300-P1-X is connected to the pico base station 100-1. Further, a terminal 300-M1-Y is connected to the macro base station 200-1. X and Y represent arbitrary indices for allowing each base station to identify a terminal.

Common matters between respective pico base stations and between respective macro base stations will be described below to read "a pico base station 100 . . . " and "a macro base station 200 . . . ", respectively. Similarly, common matters between respective terminals connected to a pico base station and between respective terminals connected to a macro base station will be described to read "a pico terminal 300-P . . . " and "a macro terminal 300-M . . . ", respectively. Further, common matters irrespectively of base stations to connect to will be described to read "a terminal 300 . . . ".

The pico base stations 100-1 and 100-2 and the macro base stations 200-1 and 200-2 can communicate with each other through a communication line NW. Further, each pico base station 100 and each macro base station 200 each can manage a plurality of communication areas (cells). In the present embodiment, an example where each pico base station 100 and each macro base station 200 each manage one communication area will be described in the present embodiment.

The pico base station 100 is a low transmission power base station, and includes a narrower communication area than that of the macro base station 200. The communication area of each pico base station 100 is a communication area at least part of which is included in the communication area of each macro base station 200.

Each pico base station 100 performs wireless communication with the terminal 300-P in the communication area managed by the pico base station 100. Each pico base station 100 can simultaneously execute wireless communication with a plurality of terminals 300-P, respectively.

Each macro base station 200 performs wireless communication with the terminal 300-M in a communication area formed by subtracting the communication area managed by the pico base station 100 from the communication area managed by the macro base station 200. Each macro base station 200 can simultaneously execute wireless communication with a plurality of terminals 300-M, respectively.

Each pico base station 100 and each macro base station 200 each include an information processing apparatus which is not illustrated. The information processing apparatus includes a central processing unit (CPU) and a storage device (a memory and a hard disk drive (HDD)) which are not illustrated. Each pico base station 100 and each macro base station 200 are each configured to realize functions described below when the CPU executes a program stored in the storage device.

Each terminal 300 is a mobile telephone terminal. In addition, each terminal 300 may be a personal computer, a PHS (Personal Handyphone System) terminal, a PDA (Personal Data Assistance or Personal Digital Assistant), a smartphone, a car navigation terminal, a game terminal or the like.

Each terminal 300 includes a CPU, a storage device (memory), an input device (key buttons and a microphone) and an output device (a display and a speaker). Each terminal 300 is configured to realize functions described below when the CPU executes a program stored in the storage device.

Figure 2:
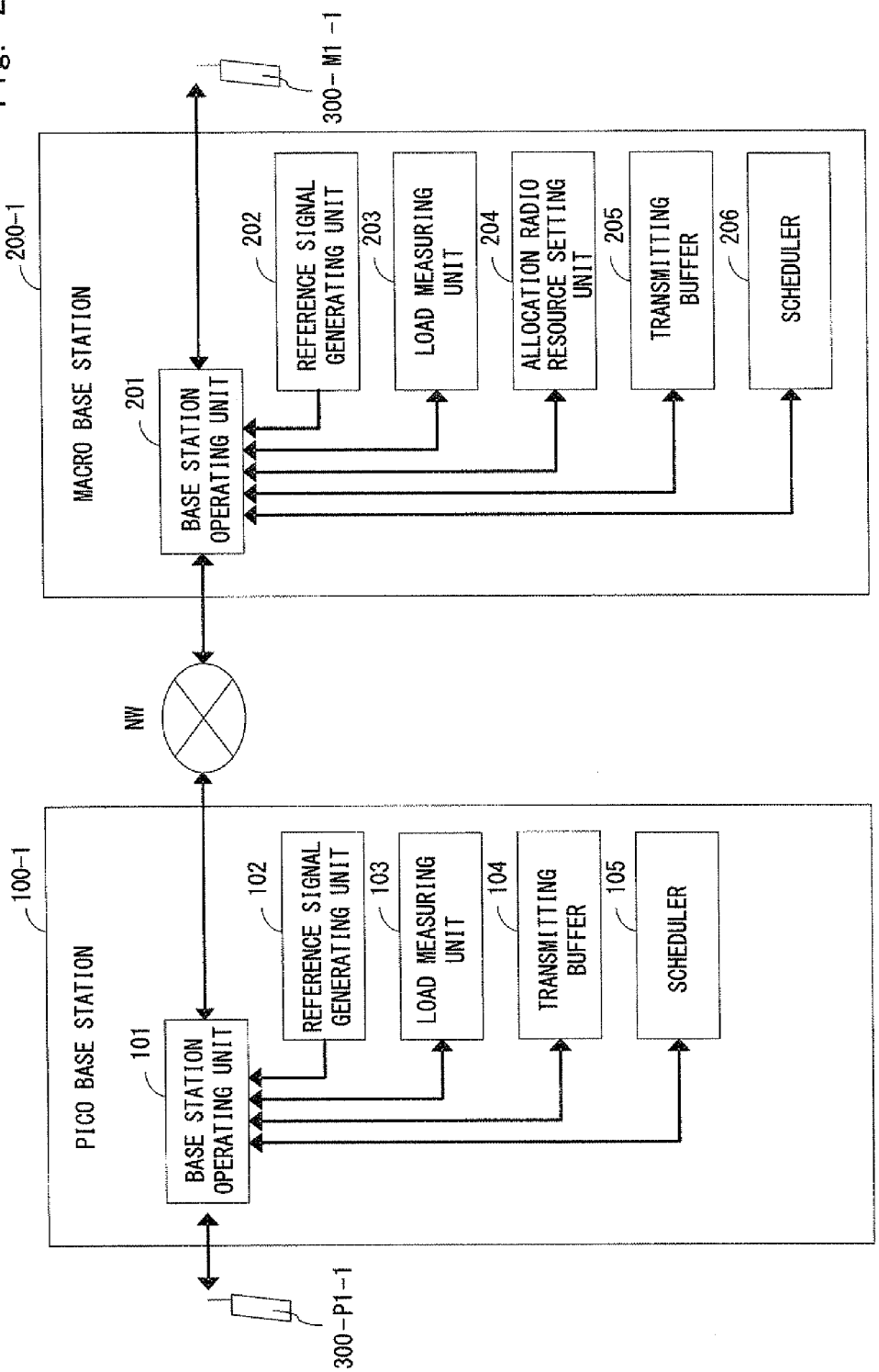
FIG. 2 is a configuration diagram of a pico base station and a macro base station according to the first embodiment.

FIG. 2 is a block diagram illustrating the functions of each pico base station 100 and each macro base station 200 in the wireless communication system 10 configured as described above. The functions will be described using the pico base station 100-1 as a pico base station and the macro base station 200-1 as a macro base station. Although not illustrated in FIG. 2, functions of the pico base station 100-2 are the same as the functions of the pico base station 100-1. Similarly, functions of the macro base station 200-2 are the same as the functions of the macro base station 200-1.

The pico base station 100-1 includes a base station operating unit 101, a reference signal generating unit 102, a load measuring unit 103, a transmitting buffer 104 and a scheduler 105.

The base station operating unit 101 has a function of transmitting and receiving radio signals to and from each terminal 300-P1 which is being connected with the pico base station 100-1, a function of notifying each terminal 300-P1 of an allocation band used to transmit and receive radio signals, scheduling information such as an MCS (Modulation and Coding Scheme) Index and setting information of transmission power, and a function of notifying each terminal 300-P1 of a report timing of CSI (Channel State Information) such as a CQI (Channel Quarity Indicator). Further, the base station operating unit 101 includes a surrounding base station list in which information used to identify the macro base station 200-1 and other surrounding macro base stations 200-$k$ ($k \neq 1$) is described, and has a function of communicating with surrounding base stations through the communication line NW, and a function of holding ABS setting information (ABS Status) notified from the surrounding base stations. However, these configurations and operations are known and therefore will not be described.

The reference signal generating unit 102 has a function of generating a reference signal which the terminal 300 uses to measure channel quality with respect to the pico base station 100-1. The reference signal generating unit 102 transmits a generated signal to each terminal 300 through the base station operating unit 101.

The load measuring unit 103 has a function of measuring a load of the pico base station 100-2 per predetermined cycle, and notifying the surrounding base stations including at least the macro base station 200-1 of information of the measured load through the base station operating unit 101. In the present embodiment, the load is a PRB (Physical Resource Block) use ratio. The PRB is a radio band allocation unit.

The transmitting buffer 104 has a function of accumulating transmission data which arrives through the communication line NW and is addressed to each terminal 300-P, and information which is used to transmit the transmission data.

The scheduler 105 has a function of determining transmission power, a frequency band and a MCS Index allocated per terminal 300-P, based on a size of transmission data accumulated in the transmitting buffer 104 and addressed to each terminal 300-P, the ABS setting information of the macro base station 200-1 held in the base station operating unit 101 and the CSI reported from each terminal 300-P, and transmitting data through the base station operating unit 101. In the present embodiment, when a current subframe is an ABS, the scheduler 105 uses a CSI of the ABS reported from each terminal 300-P. Further, when the current subframe is not an ABS (referred to as a Non-ABS below), the scheduler 105 uses a CSI of a subframe of the Non-ABS reported from each terminal 300-P.

The macro base station 200-1 includes a base station operating unit 201, a reference signal generating unit 202, a load measuring unit 203, an allocation radio resource setting unit 204, a transmitting buffer 205 and a scheduler 206.

The base station operating unit 201 has a function of transmitting and receiving radio signals to and from each terminal 300-M1 which is being connected with the macro base station 200-1, a function of determining scheduling information such as an allocation band and a MCS Index used to transmit and receive the radio signals, and setting information of transmission power per terminal 300-M1, and notifying each terminal 300-M1 of the scheduling information and the setting information, and a function of notifying each terminal 300-M1 of a report timing of a CSI. Further, the base station operating unit 201 includes a surrounding base station list in which information used to identify the pico base station 100-1, surrounding macro base stations 200-k (k≠1) and a pico base station 100-k located in a communication area of each surrounding macro base station 200-k is described, and has a function of communicating with surrounding base stations through the communication line NW. However, these configurations and operations are known and therefore will not be described.

The reference signal generating unit 202 has the same functions as those of the reference signal generating unit 102 of the pico base station 100-1, and therefore will not be described.

The load measuring unit 203 has a function of measuring a load of the macro base station 200-1 per predetermined cycle, and notifying the surrounding base stations including at least the pico base station 100-1 of information of the measured load through the base station operating unit 201. The allocation radio resource setting unit 204 uses the load measured by the load measuring unit 203, through the base station operating unit 201.

The allocation radio resource setting unit 204 has a function of updating a ratio of radio resources whose use is limited using load information notified from the pico base station 100-1, the load of the macro base station 200-1 measured by the load measuring unit 203 and current ABS setting information of the macro base station 200-1 held in the base station operating unit 201. Further, the allocation radio resource setting unit 204 has a function of calculating a delay index for determining a delay time of a terminal of the pico base station 100-1 and a delay index indicating a delay time of the macro base station 200-1 in case where radio resources whose use is limited have been set, respectively, using the updated ratio of the resources whose use is limited, the load information notified from the pico base station 100-1 and the load of the macro base station 200-1 measured by the load measuring unit 203.

Furthermore, the allocation radio resource setting unit 204 has a function of calculating a load index of the macro base station 200-1 using the load of the macro base station 200-1 measured by the load measuring unit 203 and a size (referred to a buffer size below) of transmission data which is being buffered in the transmitting buffer 205. Still further, the allocation radio resource setting unit 204 has a function of determining whether or not to set radio resources whose use is limited by the macro base station 100-1 using the calculated delay index of the pico base station 100-1 and the calculated delay index and load index of the macro base station 200-1, and notifying the pico base station 100-1 of a determination result referring to a surrounding base station list managed by the base station operating unit 201.

Figure 3:
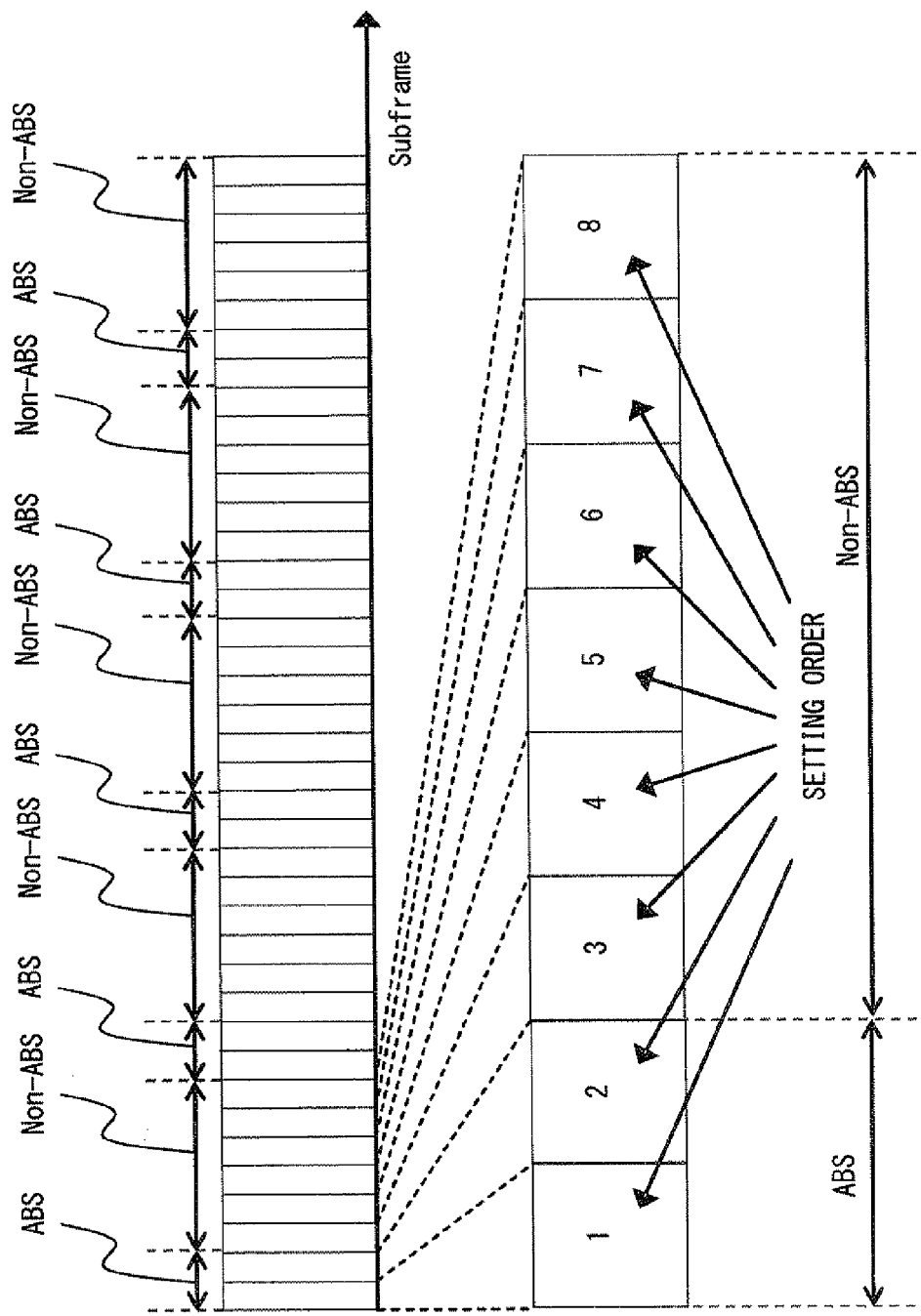
FIG. 3 is a view illustrating a method where the macro base station sets radio resources whose use is limited according to the first embodiment.

In the present embodiment, the radio resources whose use is limited are subframes of the macro base station 200-1, and subframes whose use is limited are ABSs. In the present embodiment, as illustrated in FIG. 3, ABSs are set at a cycle of eight subframes. Hence, an ABS ratio (R_abs) is calculated using subframes set in 1/8 units. Further, a numerical value in each subframe in FIG. 3 represents an ABS setting order. As illustrated in FIG. 3, when R_abs takes 2/8, the allocation radio resource setting unit 204 sets head two subframes as ABSs. Further, the allocation radio resource setting unit 204 does not set an ABS when radio resources whose use is limited are not set. Furthermore, the allocation radio resource setting unit 204 uses ABS setting information to notify a determination result. In the ABS setting information, ABSs set by the macro base station 200-1 and an ABS ratio with respect to all subframes are described. As disclosed in Non-Patent Literature 4 (3GPP TS 36.423 V10.3.0 (2011-09), 3GPP TSG RAN E-UTRAN X2AP, p. 72, September 2011), in the ABS setting information, ABS patterns indicating that an ABS is 1 and a Non-ABS is 0 are described.

The transmitting buffer 205 has the same function as that of the transmitting buffer 105 of the pico base station 100-1 and therefore will not be described.

The scheduler 206 has a function of determining transmission power, a frequency band and a MCS Index allocated per terminal 300-P, based on a size of transmission data accumulated in the transmitting buffer 205 and addressed to each terminal 300-P, the ABS setting information set by the allocation radio resource setting unit 204 and the CSI reported from each terminal 300-P, and transmitting data through the base station operating unit 101.

Figure 4:
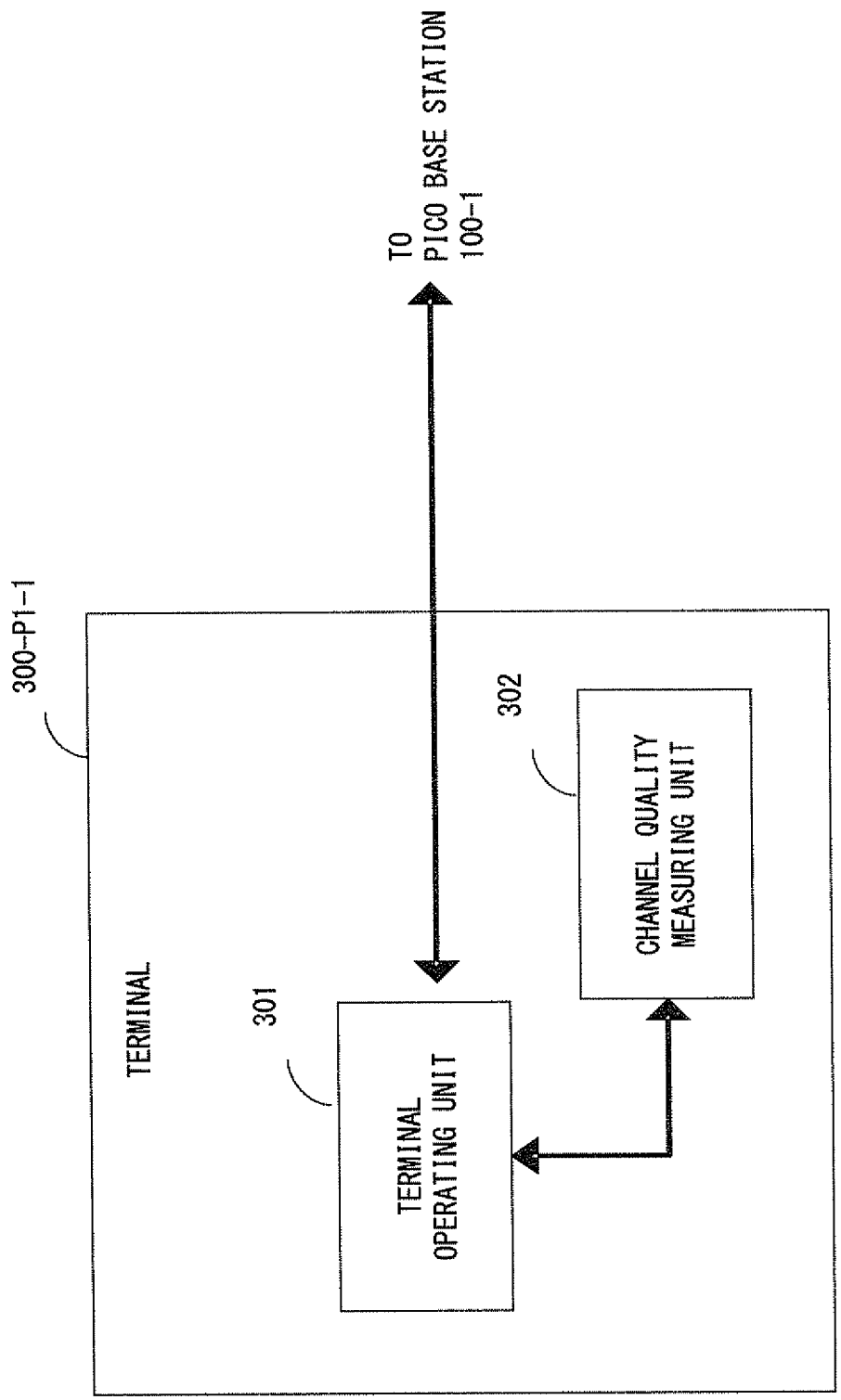
FIG. 4 is a configuration diagram of a terminal according to the first embodiment.

FIG. 4 is a block diagram illustrating a function of the terminal 300-P1-1 in the wireless communication system 10. Although not illustrated in FIG. 4, the functions of the terminal 300-P1-1 are the same as functions of the terminal 300-P1-2, the terminal 300-P2-1, the terminal 300-P2-2, the terminal 300-M1-1 and the terminal 300-M1-2. The terminal 300-P1-1 includes a terminal operating unit 301 and a channel quality measuring unit 302.

The terminal operating unit 301 has a function of transmitting and receiving radio signals to and from the pico base station 100-1 which is being connected with the terminal 300-P1-1 (communication link is established). The function of the terminal operating unit 301 is a known function of a general wireless communication system, and therefore will not be described.

The channel quality measuring unit 302 has a function of measuring channel quality with respect to a reference signal, and transmitting information of the measured channel quality to the pico base station 100-1. In the present embodiment, the channel quality is a CQI calculated from RSRP (Reference Signal Received Power) and a SINR (Signal To Interference and Noise Ratio) with respect to the reference signal of the pico base station 100-1. The RSRP is reception power of the reference signal, and is used as a reference value of cell selection or handover in the present embodiment.

[Explanation of Operation]

Figure 5A:
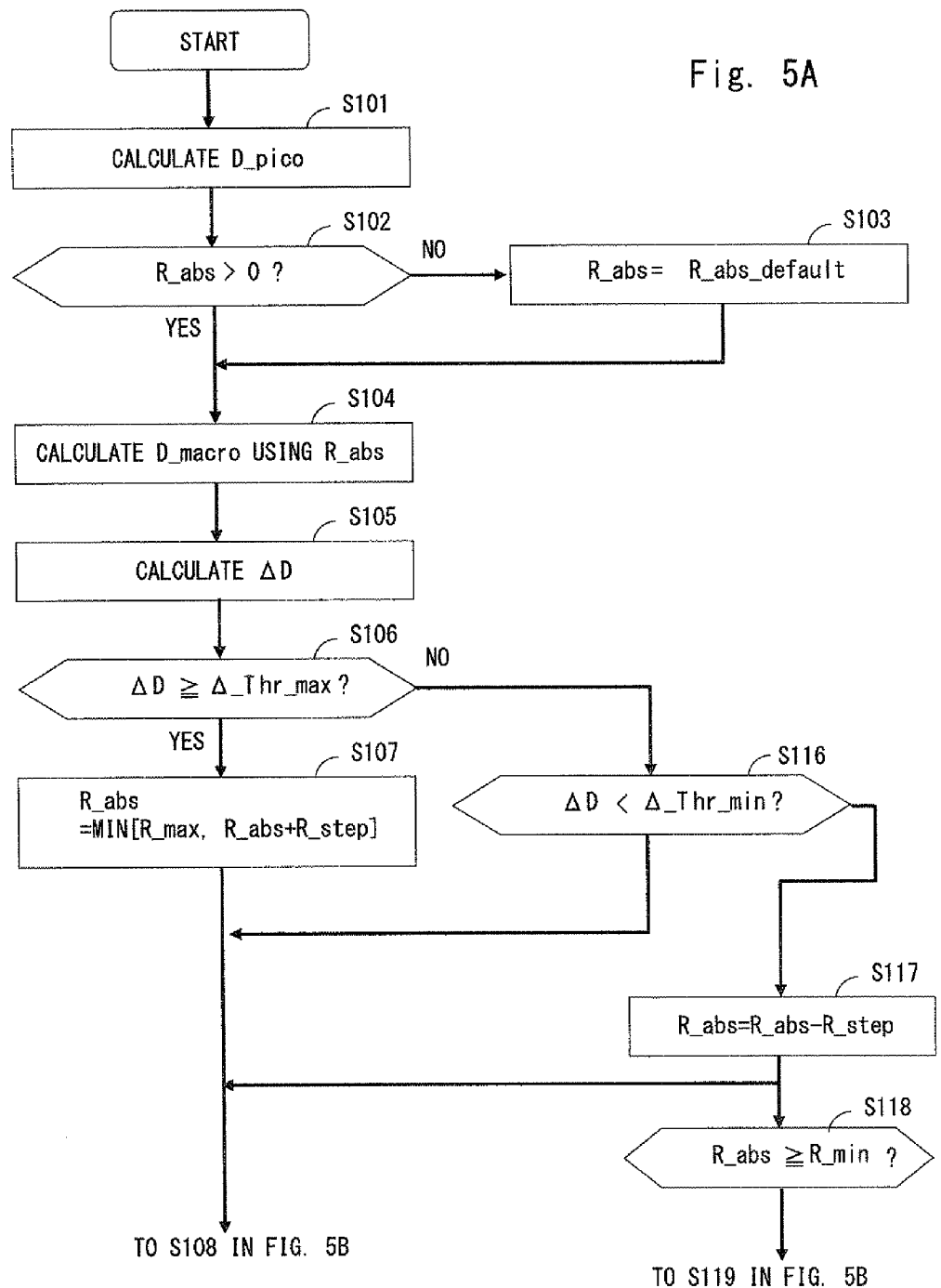
FIG. 5A is a view illustrating a method where the macro base station calculates a ratio of radio resources whose use is limited according to the first embodiment.
Figure 5B:
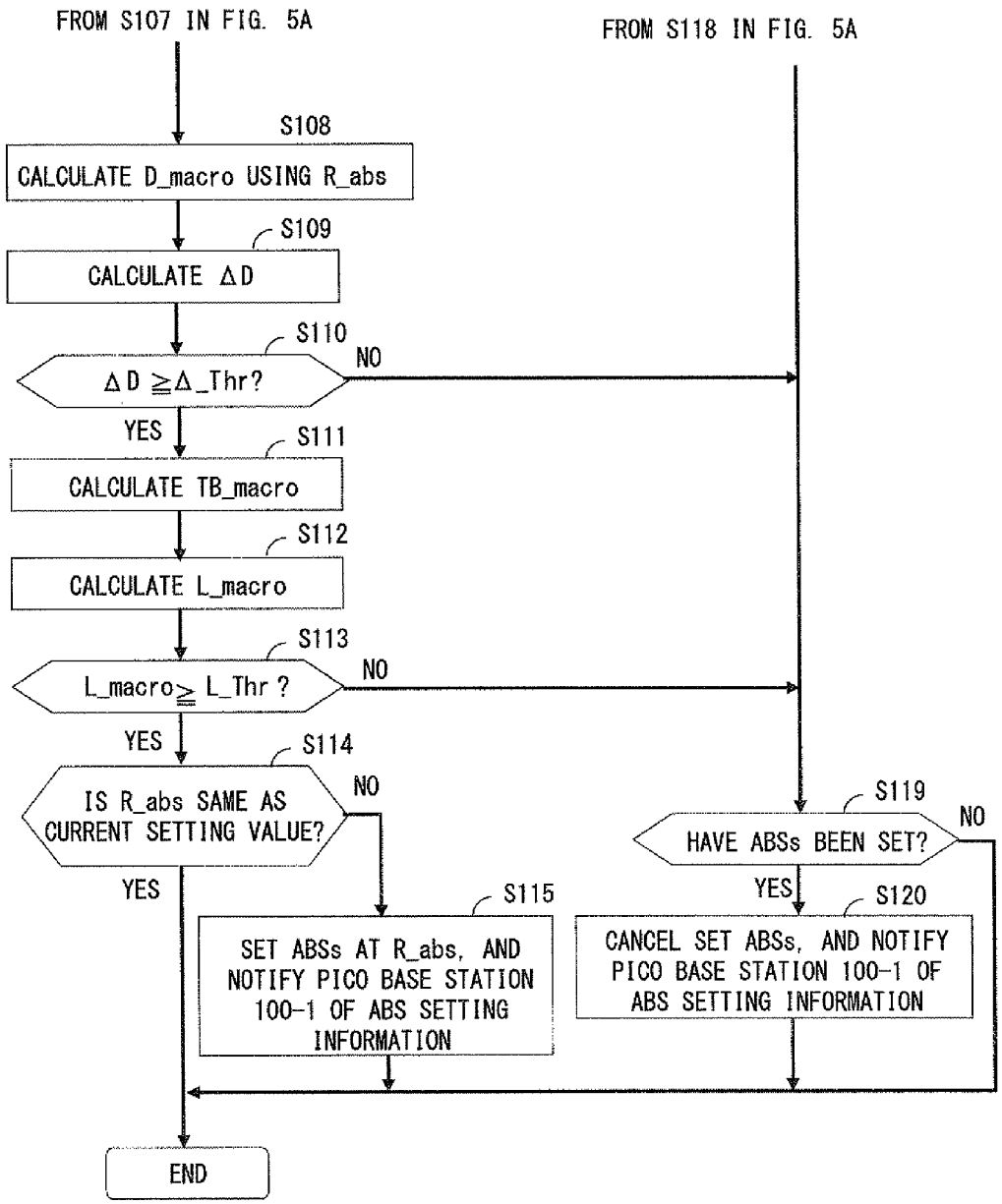
FIG. 5B is a view illustrating a method where the macro base station calculates a ratio of radio resources whose use is limited according to the first embodiment.

Next, an operation of the above wireless communication system 10 will be described with reference to FIGS. 5A and 5B. FIGS. 5A and 5B illustrate operation procedures in which the allocation radio resource setting unit 204 of the macro base station 200-1 sets radio resources whose use is limited by the macro base station 200-1. The allocation radio resource setting unit 204 executes the operations illustrated in FIGS. 5A and 5B at each cycle at which the load measuring unit 203 measures a PRB use ratio.

First, the allocation radio resource setting unit 204 calculates a delay index of the pico base station 100-1. The delay time and the PRB use ratio are correlated, and therefore the allocation radio resource setting unit 204 calculates a delay index D_pico of the pico base station 100-1 according to equation 1 (step S101). In equation 1, U_pico represents the PRB use ratio of the pico base station 100-1 notified from the pico base station 100-1.

[Mathematical 1]

$$D\_pico = U\_pico \quad (1)$$

Next, the allocation radio resource setting unit 204 determines whether or not a current ABS ratio R_abs of the macro base station 200-1 is larger than 0 (step S102).

When R_abs is larger than 0 (Step S102, Yes), the allocation radio resource setting unit 204 calculates a delay index D_macro of the macro base station 200-1 which has set radio resources whose use is limited, according to equation 2 (step S104). In equation 2, U_macro represents the PRB use ratio of the macro base station 200-1 measured by the load measuring unit 203, and w represents a weight coefficient. It is assumed that, in case where the macro base station 200-1 has set radio resources whose use is limited, a delay time becomes longer as R_abs becomes larger. In the present embodiment, the weight coefficient w is 1. However, the weight coefficient w may be set according to the number of terminals simultaneously connected with the macro base station 200-1 or channel quality of a terminal. It is assumed that, when, for example, the number of simultaneously connected terminals before ABSs are set is great, the weight coefficient is set to a value larger than 1, and a delay index further increases. This is because a transmission rate of a terminal lowers when ABSs are set, and therefore a window size of a TCP hardly expands and a transmission delay rapidly increases. Further, it is assumed that, when, for example, ABSs are set and improvement of channel quality in Non-ABSs can be expected, the weight coefficient is set to a value smaller than 1, and a delay index does not increase so much. This is because channel quality in the Non-ABSs improves, and therefore transmission rates of transmission subframes improve.

[Mathematical 2]

$$D\_macro = w \times \{U\_macro/(1-R\_abs)\} \quad (2)$$

Meanwhile, when R_abs is 0 (step S102, No), the allocation radio resource setting unit 204 sets R_abs to R_abs_ini (step S103), and moves to step S104. R_abs_ini is an initial value of an ABS ratio, and the initial value is a minimum value R_min of the ABS ratio and is set to 1/8 in the present embodiment.

Next, the allocation radio resource setting unit 204 calculates a relative delay index ΔD of the pico base station 100-1 according to equation 3 (step S105).

[Mathematical 3]

$$\Delta D = D\_pico - D\_macro \quad (3)$$

Next, the allocation radio resource setting unit 204 determines whether or not the calculated relative delay index ΔD is larger than a required value Δ_Thr_max (step S106).

When the relative delay index ΔD is larger than the required value Δ_Thr_max (step S106, Yes), the allocation radio resource setting unit 204 determines that, in case of the current ABS ratio R_abs, a delay time of the pico terminal 300-P1 with respect to the delay time of the macro terminal 300-M1 in case where the macro base station 200-1 has set radio resources whose use is limited is too large, and updates the ABS ratio R_abs according to equation 4 (step S107). In equation 4, R_step is an update step size of the ABS ratio R_abs, and takes 1/8 in the present embodiment. Further, R_max represents an upper limit value of the settable ABS ratio, and takes 7/8 in the present embodiment.

[Mathematical 4]

$$R\_abs = MIN[R\_max, R\_abs + R\_step] \quad (4)$$

Next, the allocation radio resource setting unit 204 recalculates the delay index D_macro of the macro base station 200-1 which has set the radio resources whose use is limited using the updated ABS ratio R_abs, according to equation 2 (step S108), and recalculates the relative delay index ΔD of the pico base station 100-1, too, according to equation 3 (step S109).

Next, the allocation radio resource setting unit 204 determines whether or not the recalculated relative delay index ΔD is a required value Δ_Thr or more (step S110).

When the recalculated relative delay index ΔD is the required value Δ_Thr or more (step S110, Yes), the allocation radio resource setting unit 204 determines that, in case of the updated ABS ratio R_abs, an increase in a delay time of the terminal 300-M1 in case where the macro base station 200-1 has set the radio resources whose use is limited is not great, and calculates the number of transmitted bits TB (Transmitted Bits)_macro per RB of the macro base station 200-1 which is required to calculate a load index L_macro of the macro base station 200-1, according to equation 5 (step S111). In equation 5, U_macro is a PRB use ratio of the macro base station 200-1 measured by the load measuring unit 203. BS_present is a buffer size which is being buffered in the transmitting buffer 205 in a current subframe. BS_past is a buffer size which has been buffered in a subframe a predetermined time T_subframe before from a current subframe. ΔS is a data size which has arrived at the transmitting buffer 205 in this predetermined time T_subframe.

On a right side of equation 5, a numerator represents a total size of data whose transmission has been completed by the macro base station 200-1 in the predetermined time T_subframe, and a denominator represents a total number of PRBs which the macro base station 200-1 has used to transmit data in the predetermined time T_subframe. N_PRB represents the number of allocatable PRBs per subframe, and T_subframe represents a notification cycle of a PRB use ratio.

[Mathematical 5]

$$TB\_macro[\text{bits/Subframe}] = (BS\_past + \Delta S - BS\_present)/(U\_macro \times N\_PRB \times T\_subframe) \quad (5)$$

Next, the allocation radio resource setting unit 204 calculates the load index L_macro of the macro base station 200-1 using calculated TB_macro according to equation 6A (step S112). According to equation 6A, it is possible to calculate as a load index of the macro base station 200-1 an estimated PRB use ratio which is a ratio of a total number of PRBs required until transmission of data which is being buffered in a transmitting buffer is finished, with respect to the total number of PRBs which can be used until the predetermined time T_subframe passes from a current time.

[Mathematical 6]

$$L\_macro = MIN[1.0, (BS\_present/TB\_macro)/(N\_PRB \times T\_subframe)] \quad (6A)$$

Next, the allocation radio resource setting unit 204 determines whether or not the calculated load index L_macro of the macro base station 200-1 is a threshold L_Thr or more (step S113).

When the calculated load index L_macro is the threshold L_Thr or more (step S113, Yes), the allocation radio resource setting unit 204 determines that a transmission probability of the macro base station 200-1 is high, and a probability that a pico terminal 300-P1 receives an interference from the macro base station 200-1 is high, too, and determines whether or not the updated ABS ratio is the same as a current setting value (step S114).

When the updated ABS ratio is the same as the current setting value (step S114, Yes), the allocation radio resource setting unit 204 finishes the processing in FIG. 5. Meanwhile, when the updated ABS ratio is different from the current setting value (step S114, No), the allocation radio resource setting unit 204 sets ABSs at the updated ABS ratio, and notifies the pico base station 100-1 of setting information of the set ABSs. Subsequently, the allocation radio resource setting unit 204 finishes the processing in FIG. 5.

Meanwhile, when the relative delay index ΔD is the required value Δ_Thr_max or less (step S106, No), the allocation radio resource setting unit 204 determines whether or not the relative delay index ΔD is less than a required value Δ_Thr_min (<Δ_Thr_max) (step S116). When the relative delay index ΔD is the required value Δ_Thr_min or more (step S116, No), the allocation radio resource setting unit 204 moves to step S108 without changing the ABS ratio R_abs. Meanwhile, when the relative delay index ΔD is less than the required value Δ_Thr_min (step S116, Yes), the allocation radio resource setting unit 204 determines that, in case of the current ABS ratio R_abs, an increase in a delay time of the terminal 300-M1 in case where the macro base station 200-1 has set the radio resources whose use is limited is great, and updates the ABS ratio R_abs according to equation 7 (step S117).

[Mathematical 7]

$$R\_abs = R\_abs - R\_step \quad (7)$$

Subsequently, the allocation radio resource setting unit 204 determines whether or not the updated ABS ratio R_abs is the minimum value R_min or more (step S118).

When the updated ABS ratio R_abs is the minimum value R_min or more (step S118, Yes), the allocation radio resource setting unit 204 moves to step S108. Meanwhile, when the updated ABS ratio R_abs is less than the minimum value R_min (step S118, No), the allocation radio resource setting unit 204 determines that the macro base station 200-1 cannot set ABSs, and determines whether or not the macro base station 200-1 has already set the ABSs (step S119). In case where the macro base station 200-1 has set the ABSs (step S119, Yes), the allocation radio resource setting unit 204 cancels the set ABSs, and notifies the pico base station 100-1 of the ABS setting information (step S120). Subsequently, the allocation radio resource setting unit 204 finishes the processing in FIG. 6. Meanwhile, in case where the macro base station 200-1 has not set the ABSs (step S119, No), the allocation radio resource setting unit 204 finishes the processing in FIG. 5.

Further, when the recalculated relative delay index ΔD is less than the required value Δ_Thr (step S110, No), the allocation radio resource setting unit 204 determines that, in case of the updated ABS ratio R_abs, an increase in the delay time of the terminal 300-M1 in case where the macro base station 200-1 has set radio resources whose use is limited is great, and moves to step S119.

Furthermore, when the load index L_macro of the macro base station 200-1 is less than the threshold L_Thr (step S113, No), the allocation radio resource setting unit 204 determines that a transmission probability of the macro base station 200-1 is low, and a probability that a pico terminal 300-P1 receives an interference from the macro base station 200-1 is low, too, and moves to step S119.

As described above, according to the pico base station 100-1 and the macro base station 200-1 according to the first embodiment of the present invention, when a load of the macro base station 200-1 is great, the macro base station 200-1 sets the radio resources whose use is limited such that a relative delay index of the pico base station 100-1 settles in a predetermined range. Consequently, it is possible to avoid deterioration of a 5% value of throughputs of all terminals due to deterioration of a throughput of the macro terminal 300-M, and improve fairness between throughputs of all communication terminals 300 including terminals of the macro base station 200 and the pico base station 100.

The present invention has been described above with reference to the above embodiment. However, the present invention is not limited to the above embodiment. Various changes which one of ordinary skill in the art can understand can be applied to the configurations and the details of the present invention within the scope of the present invention.

For example, as disclosed in Non-Patent Literature 5 (3GPP TS 36.314 V10.2.0 (2011-09), 3GPP TSG RAN E-UTRAN Layer 2-Measurement, p. 9, p. 11, p. 15, September 2011), the allocation radio resource setting unit 204 can also calculate a delay index using the number of Active UEs, a delay time or a throughput per terminal instead of a PRB use ratio. The throughput per terminal is, for example, a size of data whose transmission to a terminal has succeeded during a connection time of the terminal. In addition, there are a method of directly notifying between base stations of these pieces of information and a method of connecting an OAM server onto the communication line NW and notifying these pieces of information through the OAM server to calculate a delay index using the number of Active UEs, the delay time or the throughput. In case of the latter, the OAM server has a function of counting the number of Active UEs, a delay time or a throughput per terminal from each pico base station 100 and each macro base station 200 connected to the communication line NW.

Further, the allocation radio resource setting unit 204 may calculate as a relative delay index of the pico base station 100-1 a ratio of a delay index of the macro base station 200-1 in case where radio resources whose use is limited have been set, with respect to a delay index of the pico base station 100-1 instead of calculating a difference value between a delay index of the pico base station 100-1 and a delay index of the macro base station 200-1 in case where the radio resources whose use is limited have been set.

Furthermore, the allocation radio resource setting unit 204 may also use a PRB use ratio as a load index of the macro base station 200-1 without using the number of transmitted bits TB_macro per RB of the macro base station 200-1. Alternatively, the allocation radio resource setting unit 204 may also use the number of Active UEs as the load index of the macro base station 200-1.

Further, the allocation radio resource setting unit 204 can also determine whether or not the macro base station 200-1 sets radio resources whose use is limited, without calculating the load index of the macro base station 200-1. In this case, it is possible to skip step S114 to step S116 in FIG. 4 and, consequently, reduce a processing load of the macro base section 200-1 compared to the present embodiment.

Further, the present invention is also applicable even when a plurality of pico base stations are located in a communication area of a macro base station. In this case, the allocation radio resource setting unit 204 uses an average value of delay indices calculated per pico base station in the communication area or a predetermined value of a cumulative distribution as a delay index of the pico base station 100-1.

Further, it is also possible to calculate the load index L_macro of the macro base station 200-1 according to equation 6B. In equation 6B, ΔS_ave represents an average value of data sizes which arrive at the transmitting buffer 205 of the macro base station 200-1 in the predetermined time T_subframe. According to equation 6B, it is possible to calculate as a load index of the macro base station 200-1 an estimated PRB use ratio which is a ratio of a total number of PRBs required until transmission of data which is being buffered in a transmitting buffer and data produced in the predetermined time T_subframe are finished, with respect to the total number of PRBs which can be used until the predetermined time T_subframe passes from a current time.

[Mathematical 8]

$$L\_macro = MIN[1.0, \{(BS\_present + \Delta S\_ave)/TB\_macro\}/(N\_PRB \times T\_subframe)] \quad (6B)$$

In addition, ΔS_ave is updated according to equation 8 immediately before equation 6B is calculated. In equation 8, ΔS_ave_previous represents an average value of data sizes before an update, and ω represents a weight coefficient.

[Mathematical 9]

$$\Delta S\_ave = \omega \times \Delta S + (1-\omega) \times \Delta S\_ave\_previous \quad (8)$$

The above changes can be made likewise in the subsequent embodiments, too.

Second Embodiment

ABS Ratio is Directly Calculated Using Load

Next, the second embodiment of the present invention will be described in detail with reference to the drawings. Differences include that, while a ratio of radio resources whose use is limited is updated in predetermined step units according to a relative delay index of a pico base station 100-1 in the present embodiment, a ratio of radio resources whose use is limited is directly calculated using a relative delay index of the pico base station 100-1 in the present embodiment.

[Explanation of Configuration]

A pico base station according to the second embodiment is the same as a pico base station 100 according to the first embodiment, and therefore will not be described.

Figure 6:
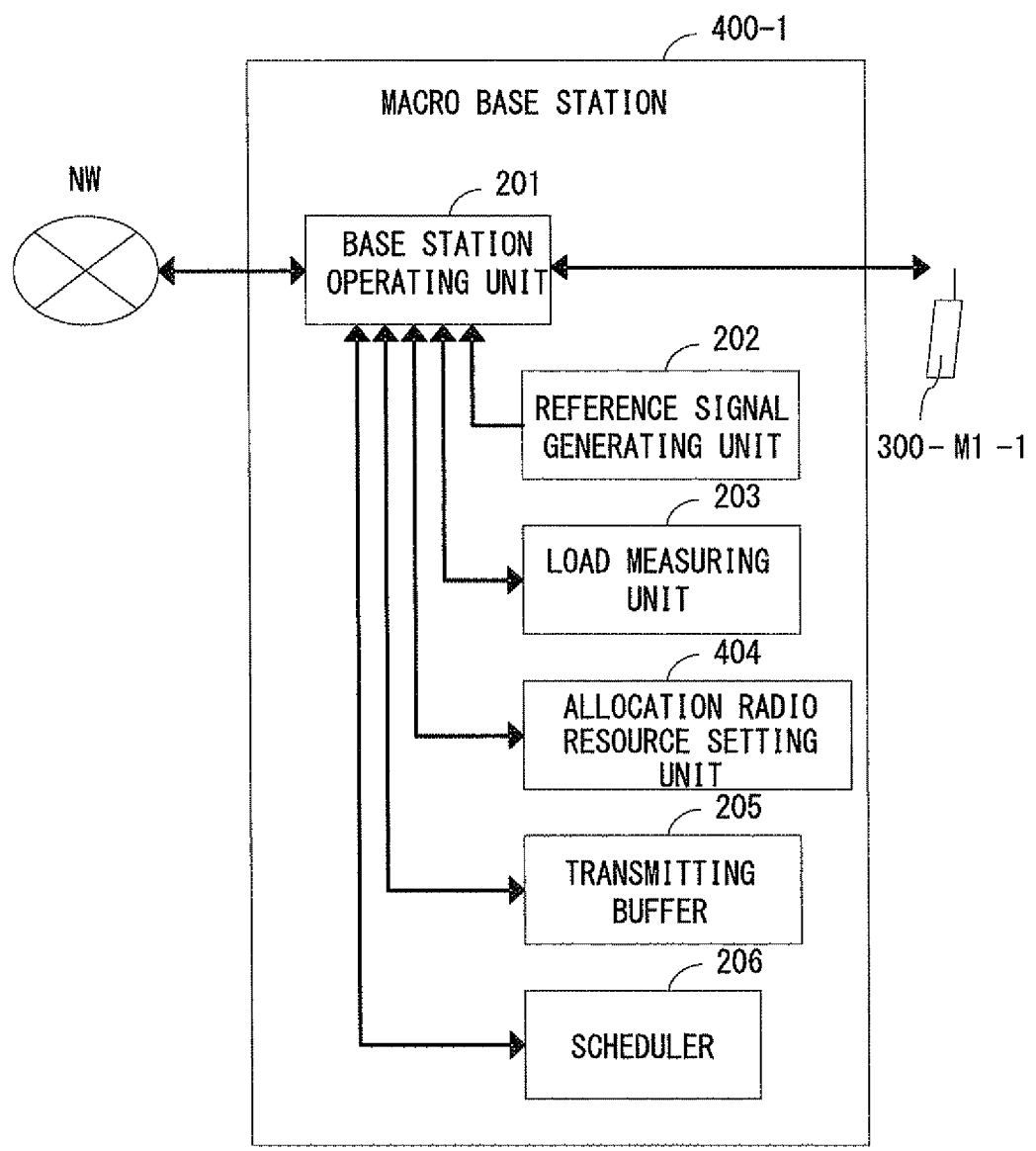
FIG. 6 is a configuration diagram of a macro base station according to a second embodiment.

FIG. 6 is a block diagram illustrating functions of each macro base station 400 according to the second embodiment. The functions will be described using a macro base station 400-1 as a macro base station. Although not illustrated in FIG. 6, functions of a macro base station 400-2 are the same as the functions of the macro base station 400-1.

The macro base station 400-1 according to the second embodiment differs from a macro base station 200-1 according to the first embodiment in including an allocation radio resource setting unit 404 instead of an allocation radio resource setting unit 204. The allocation radio resource setting unit 404 will be described below.

The allocation radio resource setting unit 404 has a function of calculating a ratio of radio resources whose use is limited using load information notified from the pico base station 100-1 and .a load of the macro base station 400-1 measured by a load measuring unit 203. Further, the allocation radio resource setting unit 404 has a function of calculating a delay index for determining a delay time of a terminal of a pico base station 100-1 and a delay index indicating a delay time of the macro base station 400-1 which has set radio resources whose use is limited, respectively, using the calculated ratio of radio resources whose use is limited, the load information notified from the pico base station 100-1 and a load of the macro base station 400-1 measured by the load measuring unit 203.

Furthermore, the allocation radio resource setting unit 404 has a function of calculating a load index of the macro base station 400-1 according to the same method as that of the allocation radio resource setting unit 204 according to the first embodiment. Still further, the allocation radio resource setting unit 404 has a function of determining whether or not to set radio resources whose use is limited by the macro base station 400-1 according to the same method as that of the allocation radio resource setting unit 204 according to the first embodiment, and notifying the pico base station 100-1 of a determination result referring to a surrounding base station list managed by a base station operating unit 201.

In the present embodiment, radio resources whose use is limited are subframes of the macro base station 400-1, and subframes whose use is limited are ABSs. When radio resources whose use is limited are set, the allocation radio resource setting unit 404 sets ABSs according to a same method as that of the allocation radio resource setting unit 204 according to the first embodiment using the calculated ABS ratio. Further, when radio resources whose use is limited are not set, the allocation radio resource setting unit 404 does not set ABSs. Furthermore, the allocation radio resource setting unit 404 uses ABS setting information to notify a determination result. In the ABS setting information, ABS patterns indicating that an ABS is 1 and a Non-ABS is 0 are described.

[Explanation of Operation]

Figure 7:
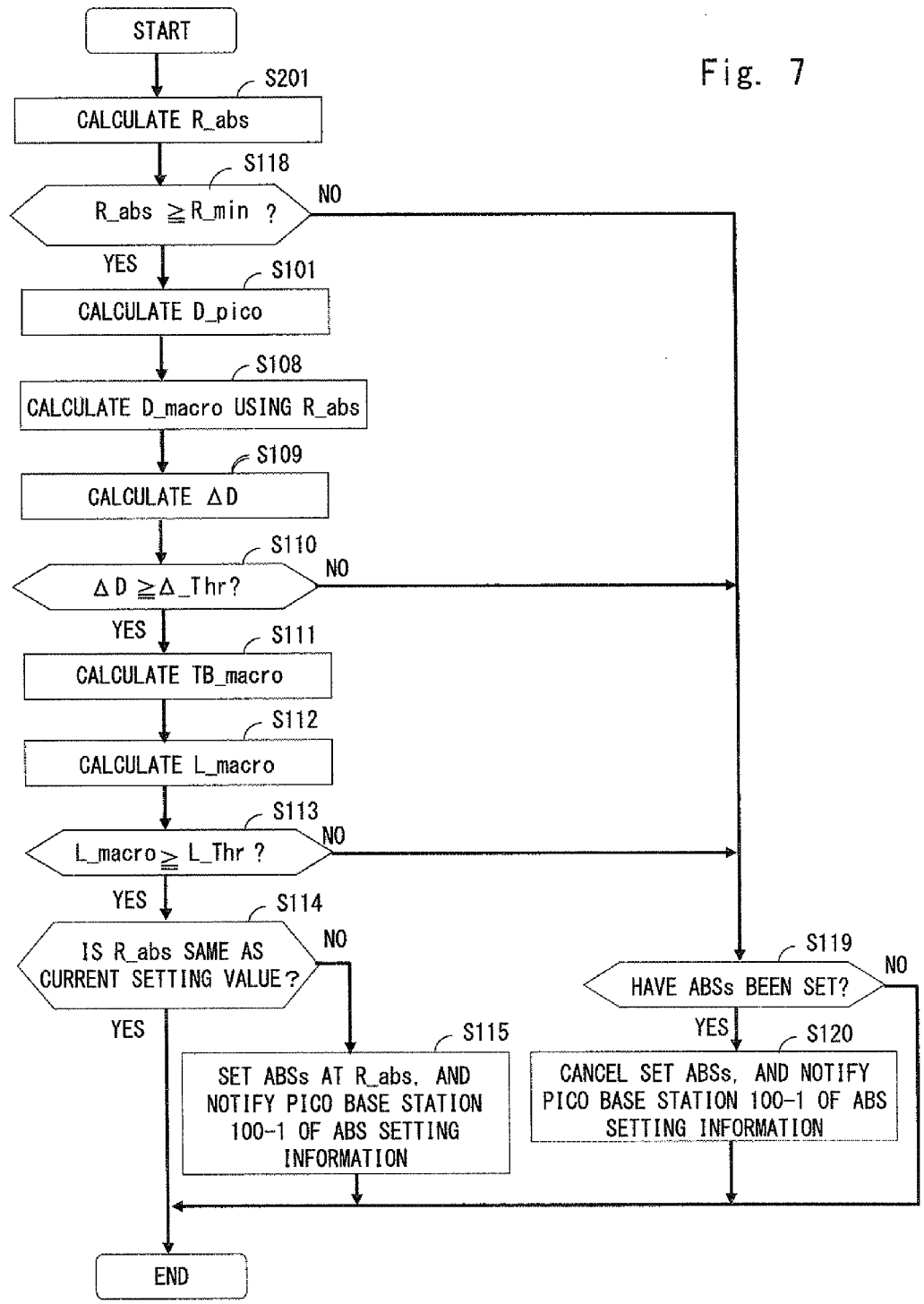
FIG. 7 is a view illustrating a method where the macro base station calculates a ratio of radio resources whose use is limited according to the second embodiment.

FIG. 7 illustrates an operation procedure in which the allocation radio resource setting unit 404 of the macro base station 400-1 sets radio resources whose use is limited. The allocation radio resource setting unit 404 executes the operation illustrated in FIG. 7 at each cycle at which the load measuring unit 203 measures a PRB use ratio.

In view of FIG. 7, step S118 in FIG. 5 moves to a step before step S101. Further, step S102 to step S109 and step S116 and step S117 in FIG. 5 are omitted, and new step S201 is added. Only the operation in added step S201 will be described below.

The allocation radio resource setting unit 404 calculates an ABS ratio R_abs according to equation 9 using a PRB use ratio U_pico of the pico base station 100-1 notified from the pico base station 100-1, and a PRB use ratio U_macro of the macro base station 400-1 measured by the load measuring unit 203 (step S201). In equation 9, R_max represents a maximum value of an ABS ratio, ΔD_target represents a target value of a relative delay index of the pico base station 100-1, and w represents a weight coefficient. In the present embodiment, the weight coefficient w takes 1.0. Still further, FLOOR{t} represents a function of returning a maximum integer which does not exceed an argument t. Equation 9 is transformed into an equation of calculating the ABS ratio R_abs using equation 1 and equation 2 by replacing AD on a left side of equation 3 with ΔD_target (an equation which is not yet transformed is provided as equation 10). Consequently, using equation 9, the allocation radio resource setting unit 404 can calculate R_abs such that the relative delay index ΔD of the pico base station 100-1 takes the target value ΔD_target.

[Mathematical 10]

$$R\_abs = MAX[R\_max, MIN[0, FLOOR\{8 \times (1 - w \times U\_macro)/(U\_pico - \Delta D\_target)\}/8]] \quad (9)$$

[Mathematical 11]

$$D\_target = D\_pico - D\_macro = U\_pico - w \times \{U\_macro/(1 - R\_abs)\} \quad (10)$$

As described above, according to the pico base station 100-1 and the macro base station 400-1 according to the second embodiment of the present invention, when a load of the macro base station 400-1 is great, it is possible to directly calculate a ratio of radio resources whose use is limited such that a relative delay index of a pico base station 700-1 takes a target value. Consequently, a time which the ratio of radio resources whose use is limited takes to converge shortens compared to the first embodiment of the present invention. Further, the time which the ratio of the radio resources whose use is limited takes to converge is short. Consequently, it is possible to improve fairness between throughputs of all terminals 300 including terminals of the macro base station 400 and the pico base station 100 in a short time compared to the first embodiment of the present invention.

The present invention has been described above with reference to the above embodiment. However, the present invention is not limited to the above embodiment. Various changes which one of ordinary skill in the art can understand can be applied to the configurations and the details of the present invention within the scope of the present invention.

For example, a difference value between a delay index of the pico base station 100-1 and a delay index of the macro base station 400-1 in case where radio resources whose use is limited have been set is calculated as a relative delay index of the pico base station 100-1 in the present embodiment. However, a ratio of the delay index of the macro base station 400-1 in case where radio resources whose use is limited have been set, with respect to the delay index of the pico base station 100-1 may be calculated. In this case, the allocation radio resource setting unit 204 calculates the ABS ratio R_abs in step S201 according to equation 11. Equation 11 is transformed into an equation of calculating the ABS ratio R_abs using equation 1 and equation 2 by replacing ΔD with ΔD_target in an equation of calculating as a relative delay index ΔD of the pico base station 100-1 a ratio of a delay index of the macro base station 200-1 in case where radio resources whose use is limited have been set, with respect to a delay index of the pico base station 100-1 (the equation which is not yet transformed is provided as equation 12). Even when a ratio of the delay indices is used, it is possible to perform control such that relative delay index takes a target value. Consequently, it is possible to provide the same effect as that obtained when a difference between delay indices is used.

[Mathematical 12]

$$R\_abs = MAX[R\_max, MIN[0, FLOOR\{8 \times (U\_pico - w \times U\_macro \times \Delta D\_target)/U\_pico\}/8]] \quad (11)$$

[Mathematical 13]

$$\Delta D\_target = D\_pico/D\_macro = U\_pico/[w \times \{U\_macro/(1 - R\_abs)\}] \quad (12)$$

The above changes can be made likewise in subsequent embodiments, too.

Third Embodiment

Limitation is Placed on Frequency

Next, the third embodiment of the present invention will be described in detail with reference to the drawings. The present embodiment differs from the second embodiment in changing radio resources whose use is limited from subframes to PRBs.

[Explanation of Configuration]

A pico base station according to the third embodiment is the same as a pico base station 100 according to the second embodiment, and therefore will not be described.

Figure 8:
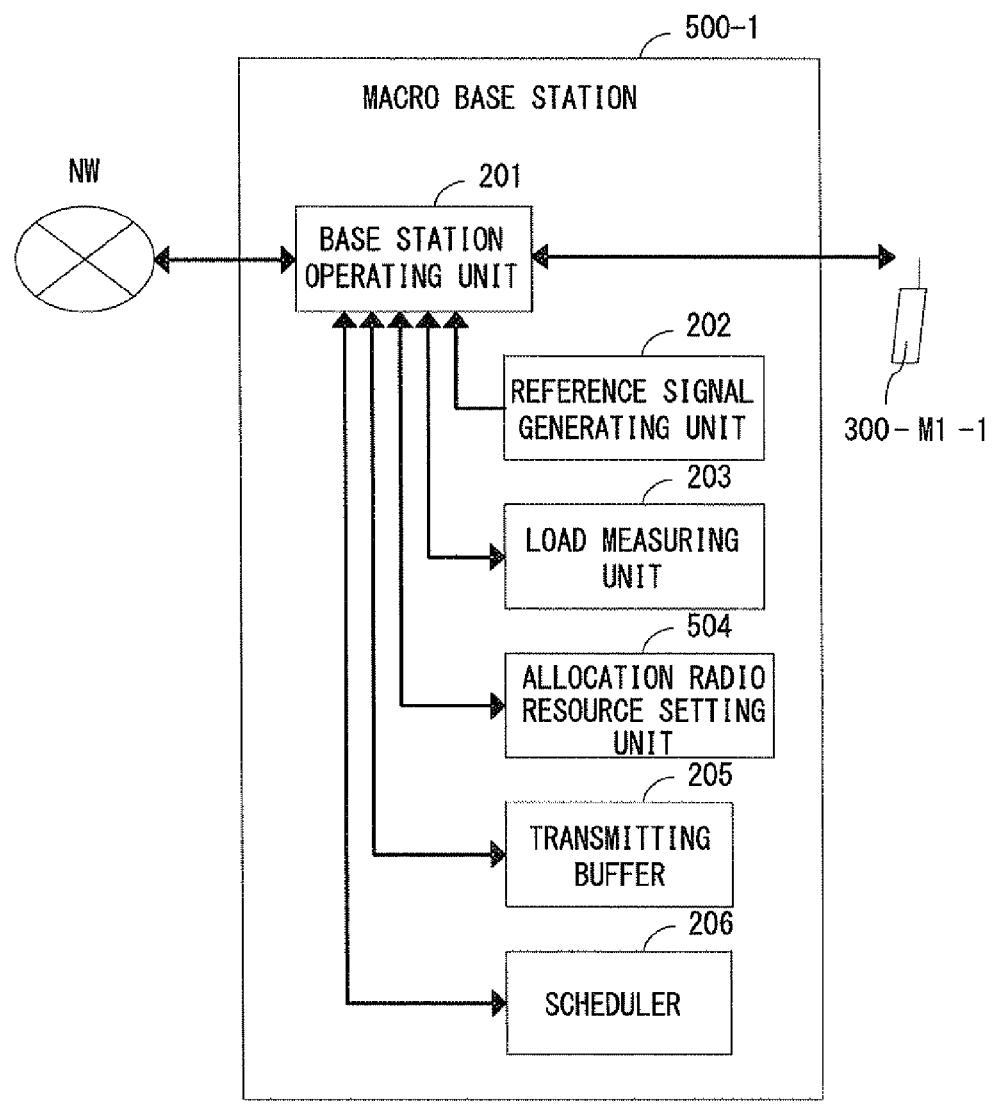
FIG. 8 is a configuration diagram of a macro base station according to a third embodiment.
Figure 9:
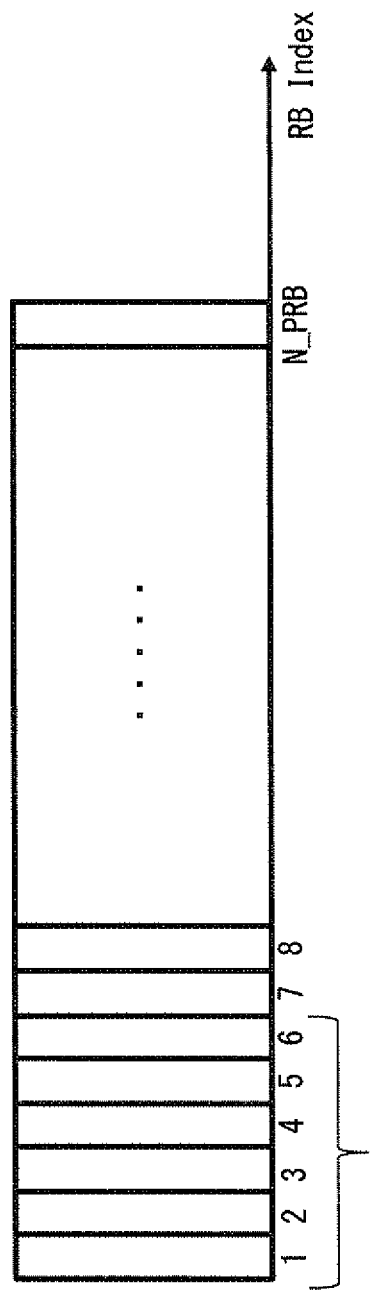
FIG. 9 is a view illustrating a method where the macro base station sets radio resources whose use is limited according to the third embodiment.

FIG. 8 is a block diagram illustrating functions of each macro base station 500 according to the third embodiment. The functions will be described using a macro base station 500-1 as a macro base station. Although not illustrated in FIG. 8, functions of a macro base station 500-2 are the same as the functions of the macro base station 500-1.

The macro base station 500-1 according to the third embodiment differs from a macro base station 400-1 according to the second embodiment in including an allocation radio resource setting unit 504 instead of an allocation radio resource setting unit 404. The allocation radio resource setting unit 504 will be described below.

The allocation radio resource setting unit 504 has the same function as that of the allocation radio resource setting unit 404 according to the second embodiment. Meanwhile, radio resources whose use is limited are different from those of the allocation radio resource setting unit 404.

In the present embodiment, radio resources whose use is limited are PRBs of the macro base station 500-1, and, when it is determined that radio resources whose use is limited are set, PRBs which are not allocated to terminals are set in order from a PRB whose index is the smallest at a calculated ratio of radio resources whose use is limited.

[Explanation of Operation]

Figure 10:
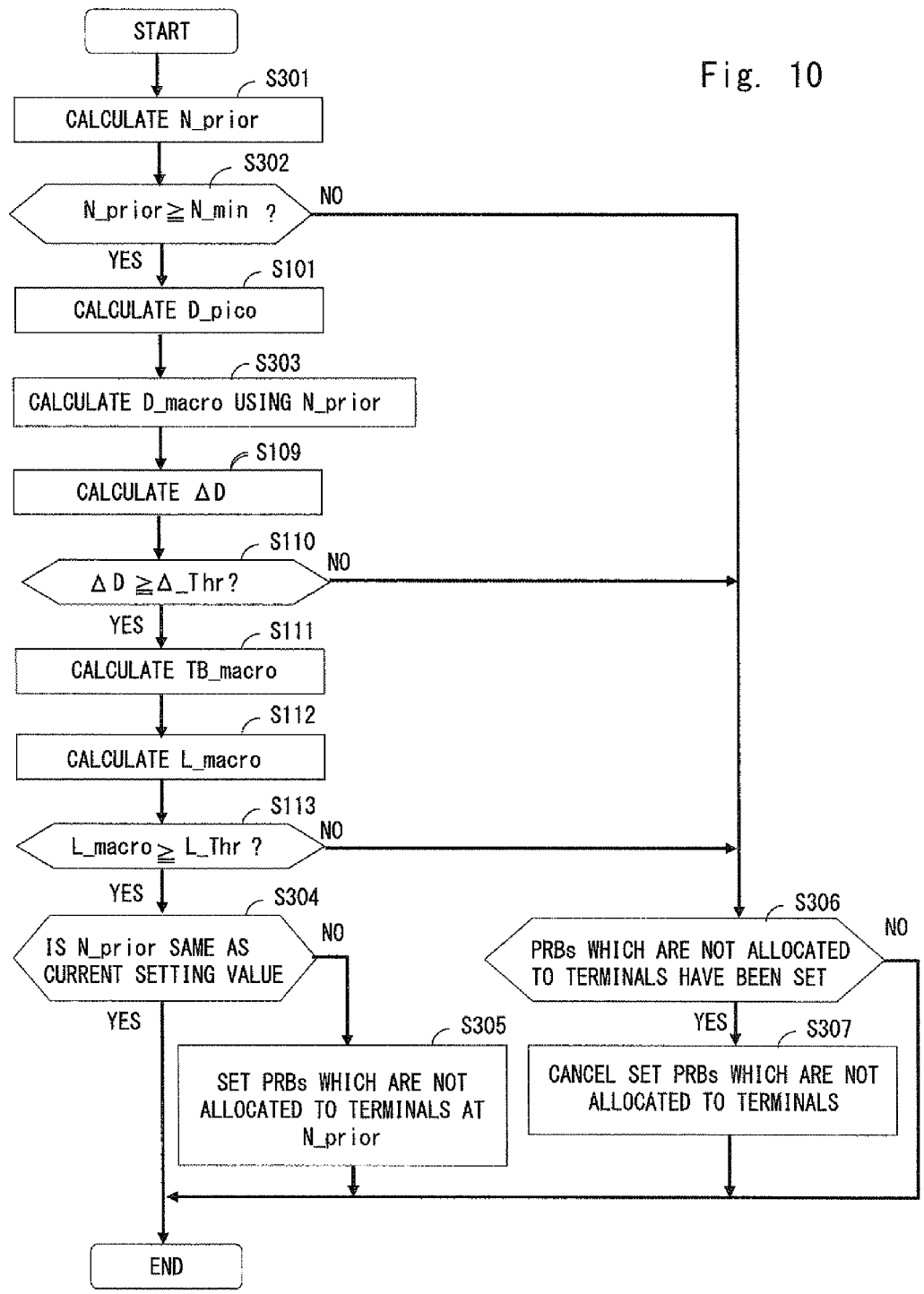
FIG. 10 is a view illustrating a method where the macro base station calculates a ratio of radio resources whose use is limited according to the third embodiment.

FIG. 10 illustrates an operation procedure in which the allocation radio resource setting unit 504 of the macro base station 500-1 sets radio resources whose use is limited. The allocation radio resource setting unit 504 executes the operation illustrated in FIG. 10 at each cycle at which a load measuring unit 203 measures a PRB use ratio.

In view of FIG. 10, step S201 in FIG. 7 is changed to step S301, step S118 in FIG. 7 is changed to step S302 and step S108 in FIG. 7 is changed to step S303, respectively. Further, steps S114, S115, S119 and S120 in FIG. 7 are omitted, and step S304 to step S307 are added. Only the operations in step S301 to step S307 will be described below.

The allocation radio resource setting unit 504 calculates the number of PRBs N_prior which are not allocated to terminals according to equation 7 using a PRB use ratio U_pico of a pico base station 100-1 notified from a pico base station 100-1 and a PRB use ratio U_macro of the macro base station 500-1 measured by the load measuring unit 203. In equation 7, w represents a weight coefficient, and takes 1.0 in the present embodiment. The allocation radio resource setting unit 504 can calculate N_prior such that a delay target index ΔD of the pico base station 100-1 takes a target value ΔD_target using equation 7.

[Mathematical 14]

$$N\_prior = MAX[N\_PRB, MIN[0, FLOOR\{N\_PRB \times (1 - w \times macro)/(U\_pico - \Delta D\_target)\}]] \quad (13)$$

Next, the allocation radio resource setting unit 504 determines whether or not calculated N_prior is a minimum value N_min or more (step S302). In the present embodiment, the minimum value N_min takes 1. When calculated N_prior is the minimum value N_min or more (step S302, Yes), the allocation radio resource setting unit 504 calculates a delay index D_pico of the pico base station 100-1 according to equation 1 (step S101), and then calculates a delay index D_macro in case where the macro base station 500-1 has set radio resources whose use is limited, using calculated N_prior according to equation 14 (step S303). In equation 14, w represents a weight coefficient, and takes 1.0 in the present embodiment.

[Mathematical 15]

$$D\_macro = w \times [U\_macro/\{1 - (N\_prior/N\_PRB)\}] \quad (14)$$

Further, when determining that a load index L_macro of the macro base station 500-1 calculated in step S115 is a threshold L_Thr or more (step S113, Yes), the allocation radio resource setting unit 504 determines whether or not calculated N_prior is the same as a current setting value (step S304).

When calculated N_prior is the same as the current setting value (step S304, Yes), the allocation radio resource setting unit 504 finishes the processing in FIG. 10. Meanwhile, when calculated N_prior is different from the current setting value (step S304, No), the allocation radio resource setting unit 504 sets PRBs which are not allocated to terminals using calculated N_prior (step S306). Subsequently, the allocation radio resource setting unit 504 finishes the processing in FIG. 10.

Further, when determining that the load index L_macro of the macro base station 500-1 calculated in step S112 is less than the threshold L_Thr (step S113, No), the allocation radio resource setting unit 504 determines whether or not PRBs which are not allocated to terminals are set (step S306).

When PRBs which are not allocated to terminals are set (step S306, Yes), the allocation radio resource setting unit 504 cancels the set PRBs which are not allocated to the terminals (step S307). Subsequently, the allocation radio resource setting unit 504 finishes the processing in FIG. 10. Meanwhile, when PRBs which are not allocated to terminals are not set (step S308, No), the allocation radio resource setting unit 504 finishes the processing in FIG. 10. Further, when calculated N_prior is less than the minimum value N_min (step S302, No), the allocation radio resource setting unit 504 moves to step S306.

The present invention has been described above with reference to the above embodiment. However, the present invention is not limited to the above embodiment. Various changes which one of ordinary skill in the art can understand can be applied to the configurations and the details of the present invention within the scope of the present invention.

For example, the allocation radio resource setting unit 504 can also update the number of RBs which are priority bands of the pico base station 100-1 such that a difference value between a delay index of the pico base station 100-1 and a delay index of the macro base station 500-1 which has set radio resources whose use is limited settles in a predetermined range according to the same method as that in the first embodiment. The above changes can be made likewise in the subsequent embodiments, too.

Fourth Embodiment

Pico Base Station Calculates ABS Ratio, and Notifies Macro Base Station of ABS Ratio Next, the fourth embodiment of the present invention will be described in detail with reference to the drawings. Differences include that, while a macro base station sets a ratio of radio resources whose use is limited and notifies a pico base station of this setting information in the second embodiment, a pico base station requests radio resources whose use is limited by the macro base station, and the macro base station sets radio resources whose use is limited according to the request from the pico base station in the present embodiment.

[Explanation of Configuration]

Figure 11:
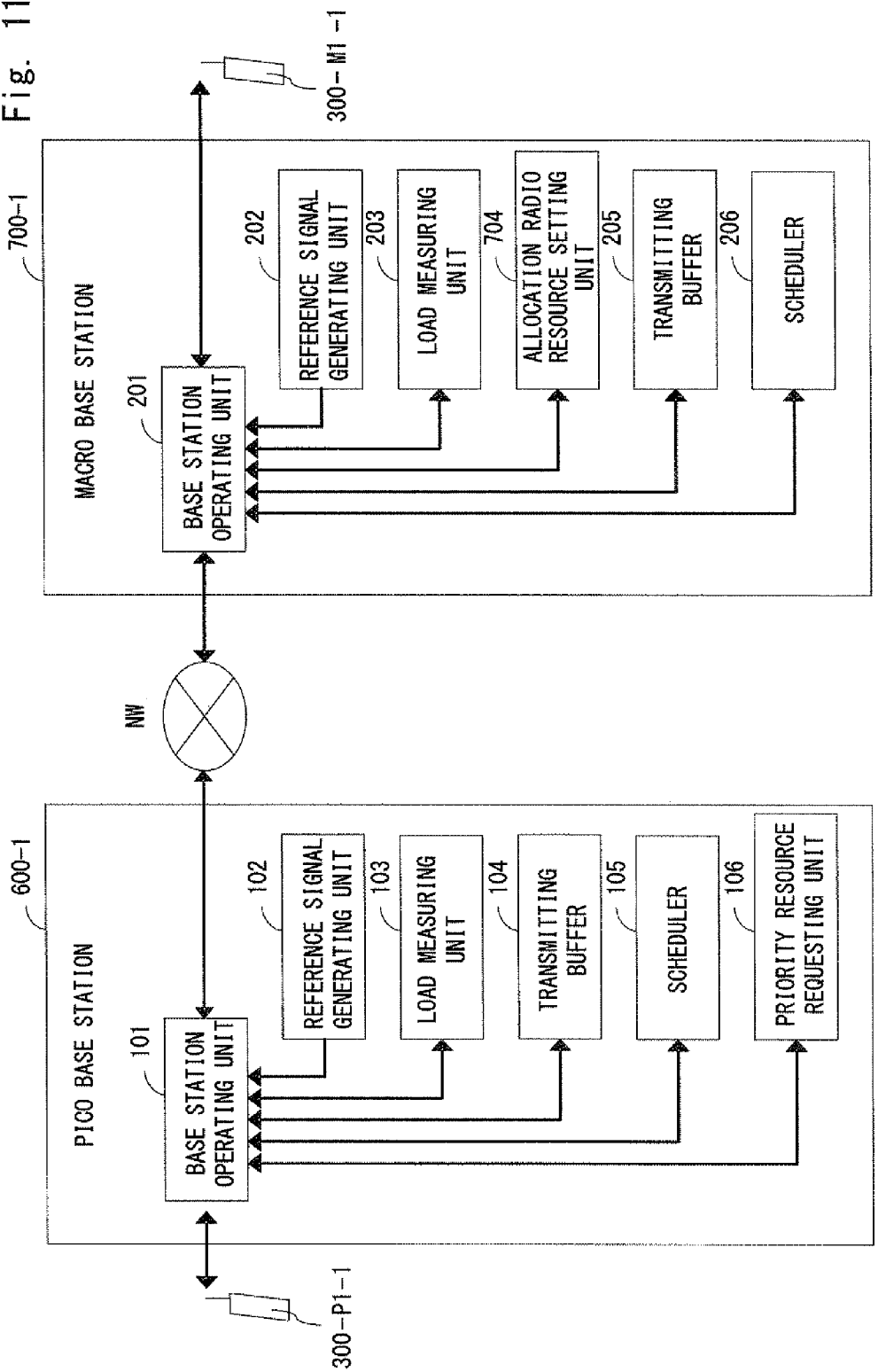
FIG. 11 is a configuration diagram of a pico base station and a macro base station according to a fourth embodiment.

FIG. 11 is a block diagram illustrating functions of each pico base station 600 and each macro base station 700 according to the fourth embodiment. The functions will be described using a pico base station 600-1 as a pico base station and a macro base station 700-1 as a macro base station. Although not illustrated in FIG. 11, functions of a pico base station 600-2 are the same as the functions of the pico base station 600-1. Similarly, functions of a macro base station 700-2 are the same as the functions of the macro base station 700-1.

The pico base station 600-1 according to the fourth embodiment differs from a pico base station 100-1 according to the second embodiment in additionally including a priority resource requesting unit 604. Further, the macro base station 700-1 according to the fourth embodiment differs from a macro base station 400-1 according to the second embodiment in including an allocation radio resource setting unit 704 instead of an allocation radio resource setting unit 204. The priority resource requesting unit 606 and the allocation radio resource setting unit 704 will be described below.

The priority resource requesting unit 606 has a function of calculating a ratio of radio resources whose use is limited using a load of the pico base station 600-1 measured by a load measuring unit 103 and load information notified from the macro base station 700-1. Further, the priority resource requesting unit 606 has a function of calculating a delay index for determining a delay time of a terminal of the pico base station 600-1 and a delay index indicating a delay time of the macro base station 700-1 in case where radio resources whose use is limited have been set, respectively, using the calculated ratio of radio resources whose use is limited, a load of the pico base station 600-1 measured by the load measuring unit 103, and the load information notified from the macro base station 700-1. Furthermore, the priority resource requesting unit 606 has a function of calculating the load index of the macro base station 400-1 using the load information notified from the macro base station 700-1. Still further, the priority resource requesting unit 606 has a function of determining whether or not to request priority resources of the pico base station 600-1, to the macro base station based on the calculated delay index of the pico base station 600-1 and the calculated delay index and load index of the macro base station 700-1, and has a function of notifying the macro base station 700-1 of a determination result referring to a surrounding base station list managed by a base station operating unit 101.

In the present embodiment, radio resources whose use is limited are ABSs of the macro base station 700-1, and ABS setting information is used to notify a determination result. The ABS setting information is generally used to notify that a base station which has set ABSs has set ABSs to surrounding base stations. However, a pico base station uses ABS setting information to request a macro base station to set ABSs in the present embodiment. In the ABS setting information, ABS patterns indicating that an ABS is 1 and a Non-ABS is 0 are described. When requesting priority resources to the macro base station 700-1, the priority resource requesting unit 606 describes a request for priority resources in ABS setting information for setting ABSs according to the same method as that of the allocation radio resource setting unit 204 according to the first embodiment using the calculated ABS ratio. Further, when not requesting priority resources to the macro base station 700-1, the priority resource requesting unit 606 describes information indicating that all subframes are Non-ABSs, in the ABS setting information.

The allocation radio resource setting unit 704 has a function of setting radio resources whose use is limited according to the ABS setting information notified from the pico base station 600-1. In the present embodiment, the radio resources whose use is limited are subframes of the macro base station 200-1, and subframes whose use is limited are ABSs. When setting radio resources whose use is limited, the allocation radio resource setting unit 704 sets ABSs according to a pattern instructed by the pico base station 600-1. Further, when not setting radio resources whose use is limited, the allocation radio resource setting unit 704 does not set ABSs.

[Explanation of Operation]

Figure 12:
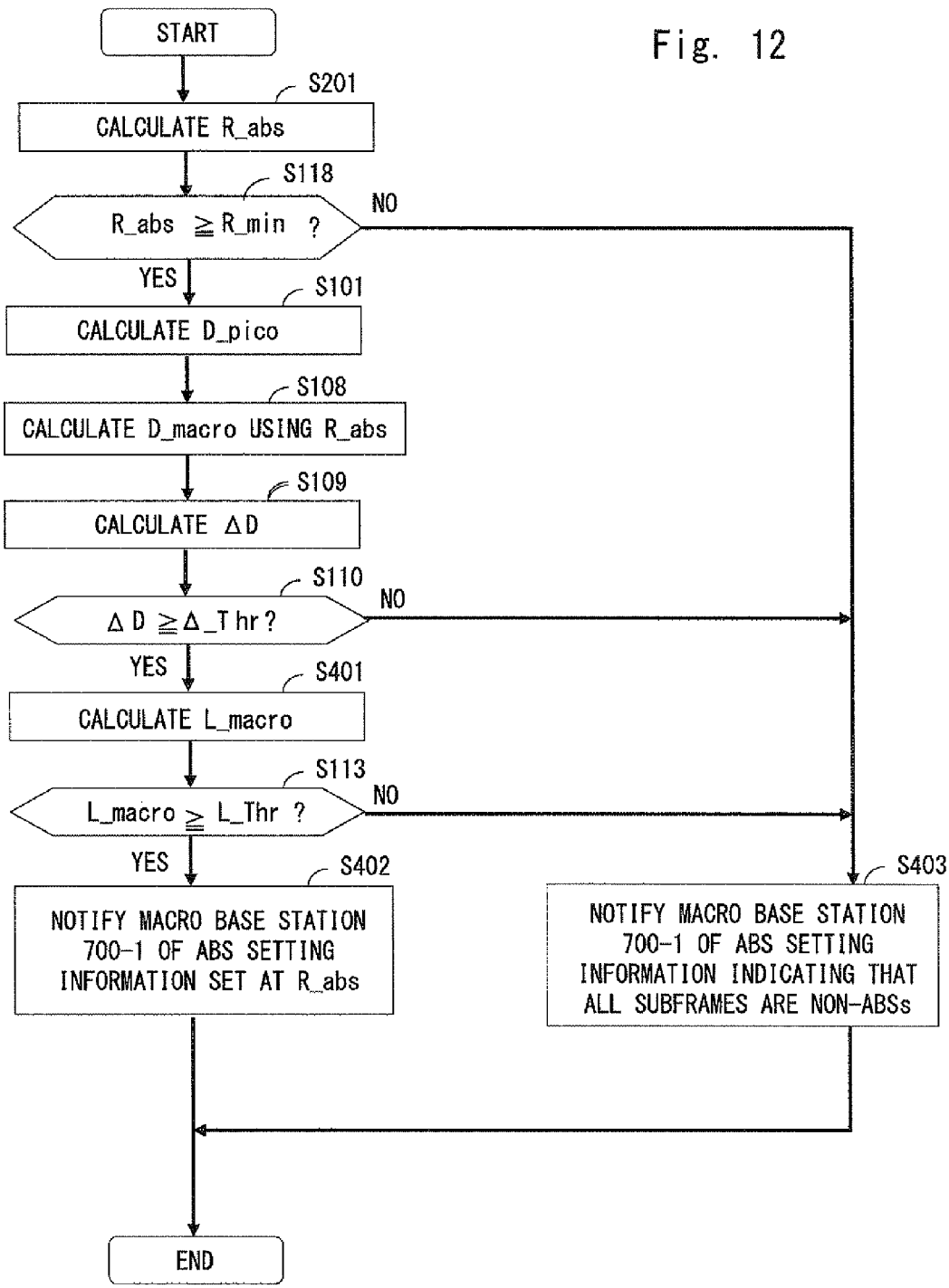
FIG. 12 is a view illustrating a method where the pico base station requests radio resources whose use is limited according to the fourth embodiment.

FIG. 12 illustrates an operation procedure in which the priority resource requesting unit 606 of the pico base station 600-1 determines whether or not to request the macro base station 700-1 to set radio resources whose use is limited. The priority resource requesting unit 606 executes the operation illustrated in FIG. 12 at each cycle at which the load measuring unit 103 measures a PRB use ratio.

In FIG. 12, step S111 and step S112 in FIG. 7 are changed to step S401. Further, steps S114, S115, S119 and S120 in FIG. 7 are omitted, and step S402 and step S403 are added. Only operations subsequent to step S401 will be described below.

The priority resource requesting unit 606 calculates a load index L_macro of the macro base station 700-1 according to equation 15 using the PRB use ratio notified from the macro base station 700-1 (step S401).

[Mathematical 16]

$$L\_macro = U\_macro \qquad (15)$$

Next, the priority resource requesting unit 606 determines whether or not the calculated load index L_macro of the macro base station 700-1 is a threshold L_Thr or more (step S116).

When the calculated load index L_macro is the threshold L_Thr or more (step S113, Yes), the priority resource requesting unit 606 determines that a transmission probability of the macro base station 700-1 is high, and a probability that a pico terminal 300-P1 receives an interference from the macro base station 700-1 is high, too, and notifies the macro base station 700-1 of ABS setting information for setting ABSs set using an ABS ratio R_abs calculated in step S201 (step S402). Subsequently, the priority resource requesting unit 606 finishes the processing in FIG. 10.

When the calculated load index L_macro is less than the threshold L_Thr (step S116, No), the priority resource requesting unit 606 determines that a transmission probability of the macro base station 700-1 is low, and a probability that a pico terminal 300-P1 receives an interference from the macro base station 700-1 is low, too, and notifies the macro base station 700-1 of the ABS setting information indicating that all subframes are Non-ABSs. Subsequently, the priority resource requesting unit 606 finishes the processing in FIG. 10.

Figure 13:
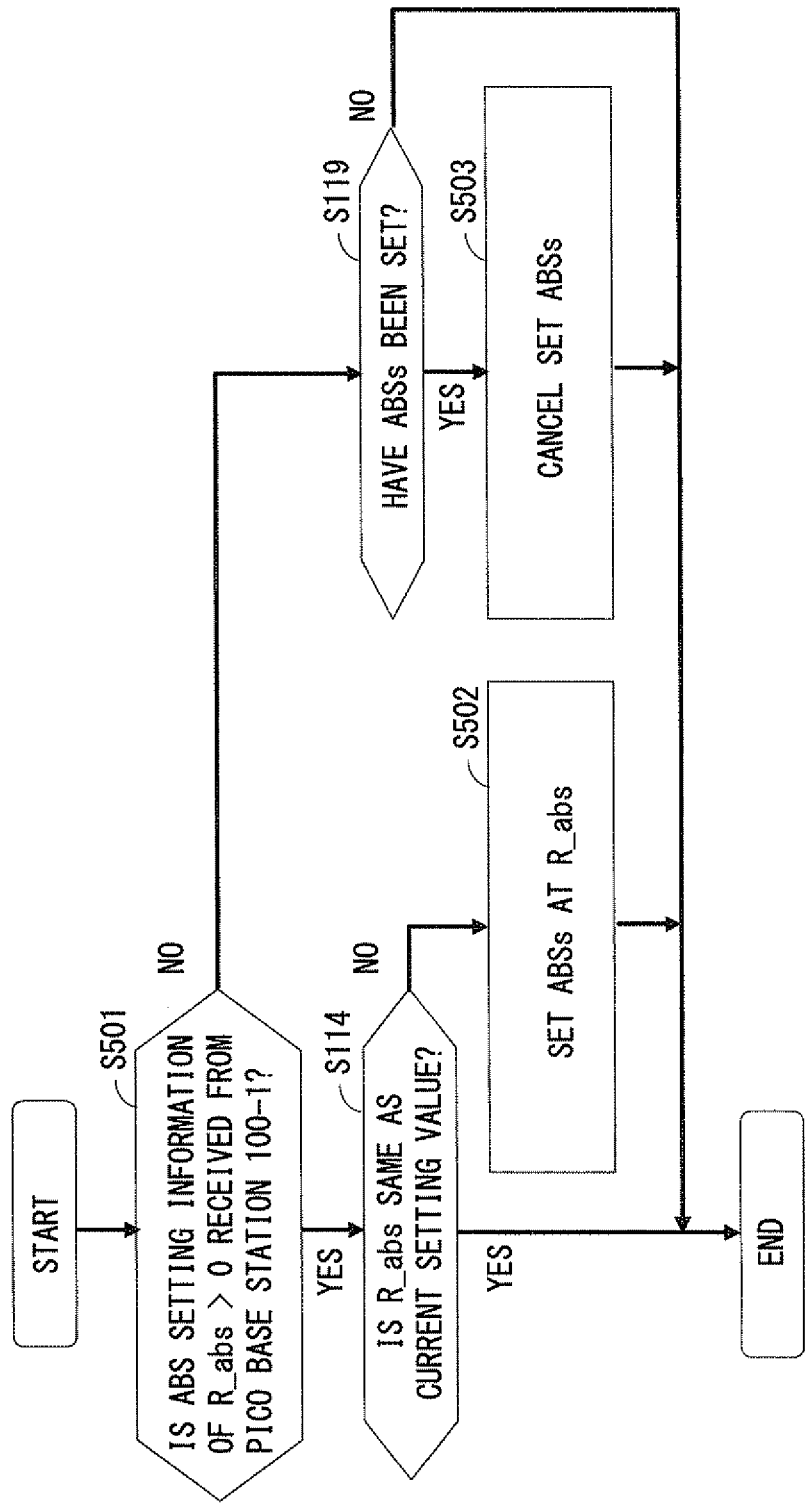
FIG. 13 is a view illustrating a method where the macro base station sets radio resources whose use is limited according to the fourth embodiment.
Figure 14:
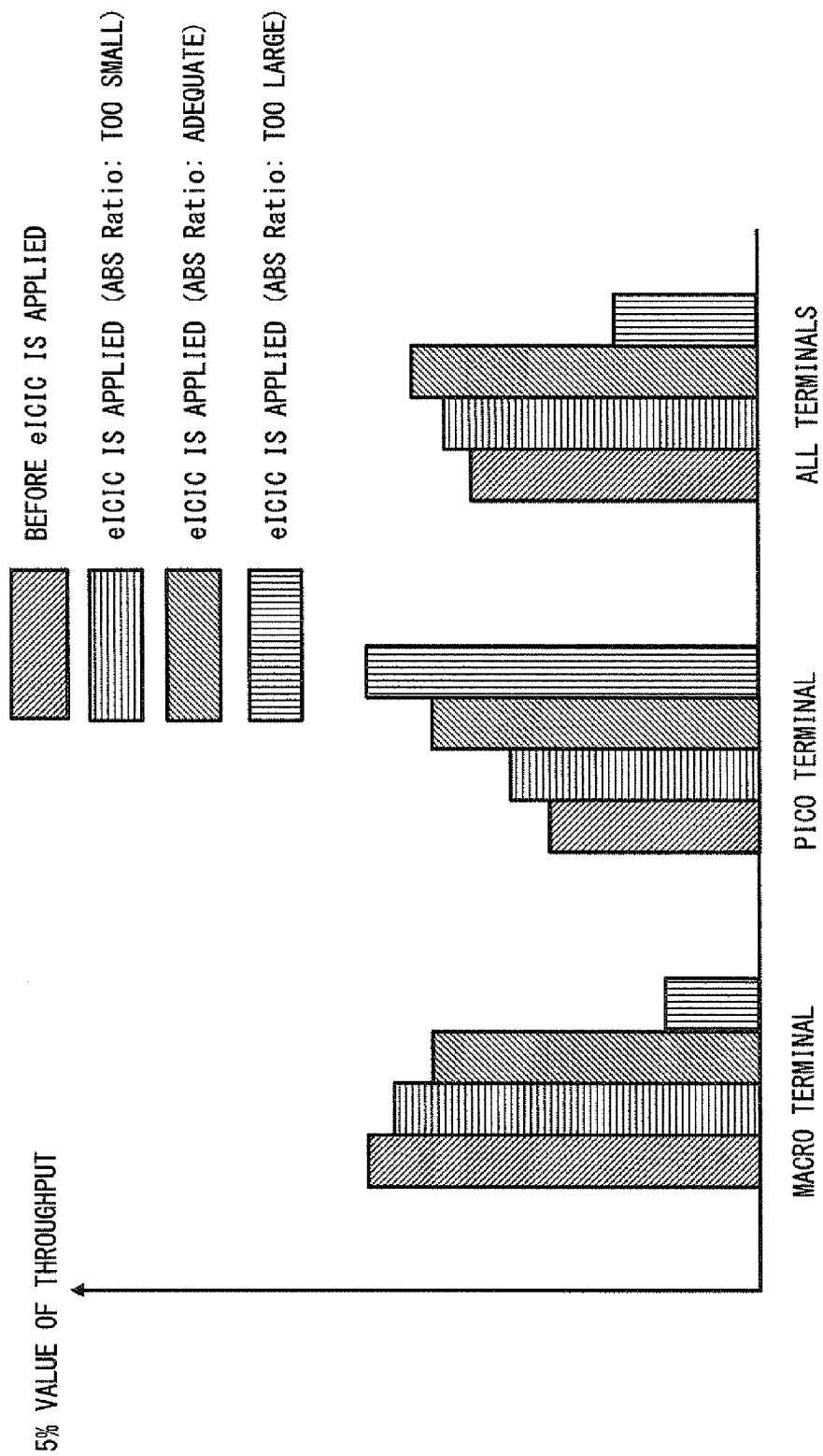
FIG. 14 is a view illustrating a problem caused when eICIC is applied.

FIG. 13 illustrates an operation procedure in which the allocation radio resource setting unit 704 of the macro base station 700-1 sets radio resources whose use is limited according to ABS setting information from the pico base station 600-1. The allocation radio resource setting unit 704 executes the operation illustrated in FIG. 13 every time the allocation radio resource setting unit 704 receives RNTP from the pico base station 600-1.

First, the allocation radio resource setting unit 704 determines whether or not the ABS ratio R_abs described in the ABS setting information notified from the pico base station 600-1 to the macro base station 700-1 is larger than 0 (step S501).

When the ABS ratio R_abs is larger than 0 (step S501, Yes), the allocation radio resource setting unit 704 determines whether or not R_abs is the same as a current setting value (step S114).

When R_abs is the same as the current setting value (step S114, Yes), the allocation radio resource setting unit 704 finishes the processing in FIG. 13. Meanwhile, when R_abs is different from the current setting value (step S114, No), the allocation radio resource setting unit 704 sets ABSs at R_abs (step S502). Subsequently, the allocation radio resource setting unit 704 finishes the processing in FIG. 13.

Further, when the ABS ratio R_abs is 0 (step S501, No), the allocation radio resource setting unit 704 determines whether or not the macro base station 700-1 has already set ABSs (step S119). In case where the macro base station 700-1 has already set ABSs (step S119, Yes), the allocation radio resource setting unit 704 cancels the set ABSs (step S503). Subsequently, the allocation radio resource setting unit 704 finishes the processing in FIG. 13. Meanwhile, in case where the macro base station 700-1 has not set ABSs (step S119, No), the allocation radio resource setting unit 704 finishes the processing in FIG. 13.

The present invention has been described above with reference to the above embodiment. However, the present invention is not limited to the above embodiment. Various changes which one of ordinary skill in the art can understand can be applied to the configurations and the details of the present invention within the scope of the present invention.

For example, the allocation radio resource setting unit 704 cancels a limitation placed on set radio resources whose use is limited when ABS setting information indicating that the ABS ratio is 0 is notified from the pico base station 600-1. However, a limitation on radio resources may be canceled when a predetermined time passes after setting the radio resources whose use is limited is started. In this case, the priority resource requesting unit 606 can skip the processing in step S403. Consequently, it is possible to reduce a processing load of the pico base station 600-1 compared to the present embodiment. Further, the pico base station 600-1 only needs to notify ABS setting information in case where the macro base station 700-1 sets radio resources whose use is limited. Consequently, it is possible to suppress a signaling amount between base stations through a communication line NW compared to the present embodiment.

Furthermore, ABSs are set by setting radio resources whose use is limited in the present embodiment. However, similar to the third embodiment, it is also possible to set to each terminal 300-M1 an allocatable band as a band formed by excluding a priority band of the pico base station 600-1 from a system band. In this case, the priority resource requesting unit 606 calculates the number of RBs which are priority bands of the pico base station 600-1 according to the same method as that of an allocation radio resource setting unit 504 of a macro base station 500-1 according to the third embodiment, and notifies the macro base station 700-1 of a calculation result. RNTP is used to notify a calculation result. 1 is set to RNTP in a RB (Resource block) which is requested as a priority band, and 0 is set to RNTP in a RB which is not requested as a priority band. A RB represents a frequency block which is a radio band allocation unit.

Further, the present invention is also applicable even when a plurality of pico base stations are located in a communication area of a macro base station. In this case, the allocation radio resource setting unit 704 calculates a rate of the number of pico base stations which have notified ABS setting information indicating that an ABS ratio is larger than 0, with respect to a total number of base stations in a communication area, and sets ABSs according to ABS setting information of the lowest ABS ratio among ABS ratios which are larger than 0 only when the rates are a threshold of the rates or more. Alternatively, the allocation radio resource setting unit 704 can also set ABSs to subframes whose ABSs overlap among a plurality of pieces of ABS setting information.

In addition, the present invention is not limited to the above embodiments, and can be optionally changed without departing from the spirit of the present invention.

Although the present invention has been described as a hardware configuration in the above embodiments, the present invention is not limited to these. The present invention can also be realized by causing a CPU (Central Processing Unit) to execute a computer program to perform the processing in a terminal or a base station. In this case, the computer program can be supplied to the computer by being stored using various types of non-transitory computer readable media. The non-transitory computer readable media include various types of tangible storage media. The non-transitory computer readable media include, for example, magnetic recording media (e.g. flexible disks, magnetic tapes and hard disk drives), magnetooptical recording media (e.g. magnetooptical disks), CD-ROMs (Read Only Memory), CD-Rs, CD-R/Ws, and semiconductor memories (e.g. mask ROMs, PROMs (Programmable ROM), EPROMs (Erasable PROM), flash ROMs and RAMs (Random Access Memory)). Further, the program may be supplied to the computer using various types of transitory computer readable media. The transitory computer readable media include, for example, electric signals, optical signals and electromagnetic waves. The transitory computer readable media can supply the program to the computer using wired communication channels such as electric wires and optical fibers or wireless communication channels.

Although the present invention has been described above with reference to the embodiments, the present invention is by no means limited to the above embodiments. Various changes which one of ordinary skill in the art can understand can be applied to the configurations and the details of the present invention within the scope of the invention.

This application claims priority to Japanese Patent Application No. 2012-246962 filed on Nov. 9, 2012, the entire contents of which are incorporated by reference herein.

REFERENCE SIGNS LIST

10 RADIO COMMUNICATION SYSTEM
100-1, 100-2, 600-1 PICO BASE STATION
200-1, 200-2, 400-1, 500-1, 700-1 MACRO BASE STATION
300-P1-1, 300-P1-2, 300-P2-1, 300-P2-2, 300-M1-1, 300-M1-2, 300-M2-1, 300-M2-2 TERMINAL
101, 201 BASE STATION OPERATING UNIT
102, 202 REFERENCE SIGNAL GENERATING UNIT
103, 203 LOAD MEASURING UNIT
104, 205 TRANSMITTING BUFFER
105, 206 SCHEDULER
606 PRIORITY RESOURCE REQUESTING UNIT
204, 404, 504, 704 ALLOCATION RADIO RESOURCE SETTING UNIT
301 TERMINAL OPERATING UNIT
302 CHANNEL QUALITY MEASURING UNIT

What is claimed is:

1. A radio resource setting method for, when there are a first communication area managed by a first base station and a second communication area including at least part of the first communication area and managed by a second base station, setting radio resources that the first and second base stations can use for wireless communication with a terminal, the radio resource setting method comprising:
    obtaining loads of the first communication area and the second communication area;
    calculating a first delay index of the first communication area using the load of the first communication area;
    calculating using the load of the second communication area a second delay index of the second communication area in case where the radio resources whose use is limited in the second communication area have been set;
    calculating a ratio of radio resources whose use is limited in the second communication area based on the first delay index and the second delay index; and
    setting the radio resources whose use is limited in the second communication area using the ratio of the radio resources whose use is limited.

2. The radio resource setting method according to claim 1, further comprising, upon calculation of the ratio of the radio resources whose use is limited, calculating a relative delay index that is a difference between or a ratio of the first delay index and the second delay index,
    wherein the ratio of the radio resources whose use is limited
    is updated to a value that is a predetermined addition step larger than a latest ratio of the radio resources whose use is limited when the relative delay index is larger than a first threshold of the relative delay index, and
    is updated to a value that is a predetermined subtraction step smaller than the latest ratio of the radio resources whose use is limited when the relative delay index is smaller than a second threshold of the relative delay index.

3. The radio resource setting method according to claim 1, wherein the ratio of the radio resources whose use is limited is calculated using the first delay index, the second delay index and a difference between or a ratio of the first delay index and the second delay index.

4. The radio resource setting method according to claim 1, wherein the load is a band use ratio.

5. The radio resource setting method according to claim 1, wherein the load is a number of terminals.

6. The radio resource setting method according to claim 1, wherein the load is a delay time of the terminal.

7. The radio resource setting method according to claim 1, wherein the load is a throughput of the terminal.

8. The radio resource setting method according to claim 1, wherein the second base station calculates the ratio of the radio resources whose use is limited in the second communication area.

9. The radio resource setting method according to claim 1, wherein the first base station calculates the ratio of the radio resources whose use is limited in the second communication area, and notifies the second base station of a result of the calculation.

10. A base station that performs wireless communication with a terminal in a second communication area that is at least one of a neighboring communication area of a first communication area or a communication area including part of the first communication area, the base station comprising:
    a load measuring unit that measures a load of the second communication area; and
    an allocation ratio resource setting unit that calculates a first delay index of the first communication area using the load of the first communication area notified from an other base station that manages the first communication area,
    calculating using the load of the second communication area a second delay index of the second communication area in case where the radio resources whose use is limited in the second communication area have been set, and
    calculating a ratio of radio resources whose use is limited in the second communication area based on the first delay index and the second delay index.

11. The base station according to claim 10, wherein the allocation radio resource setting unit calculates a relative delay index that is a difference between or a ratio of the first delay index and the second delay index, and updates the ratio of the radio resources whose use is limited, to a value that is a predetermined addition step larger than a latest ratio of the radio resources whose use is limited when the relative delay index is larger than a first threshold of the relative delay index, and
    updates the ratio of the radio resources whose use is limited, to a value that is a predetermined subtraction step smaller than the latest ratio of the radio resources whose use is limited when the relative delay index is smaller than a second threshold of the relative delay index.

12. The base station according to claim 10, wherein the allocation radio resource setting unit calculates the ratio of the radio resources whose use is limited using the first delay index, the second delay index and a difference between or a ratio of the first delay index and the second delay index.

13. The base station according to claim 10, wherein the load is a band use ratio.

14. The base station according to claim 10, wherein the load is a number of terminals.

15. The base station according to claim 10, wherein the load is a delay time of the terminal.

16. The base station according to claim 10, wherein the load is a throughput of the terminal.

17. A base station that, when there is a second communication area that is at least one of a neighboring communication area of a first communication area or a communication area including part of the first communication area, performs wireless communication with a terminal in the first communication area, the base station comprising:
    a load measuring unit that measures a load of the first communication area; and
    a priority resource requesting unit that calculates a first delay index of the first communication area using the load of the first communication area,
    calculating using the load of the second communication area transmitted from an other base station that manages the second communication area a second delay index of the second communication area in case where the radio resources whose use is limited in the second communication area have been set, and
    calculating a ratio of radio resources whose use is limited in the second communication area based on the first delay index and the second delay index, and notifying the other base station that manages the second communication area of a result of the calculation.

18. The base station according to claim 17, wherein the priority resource requesting unit calculates a relative delay index that is a difference between or a ratio of the first delay index and the second delay index, and updates the ratio of the radio resources whose use is limited, to a value that is a predetermined addition step larger than a latest ratio of the radio resources whose use is limited when the relative delay index is larger than a first threshold of the relative delay index, and
    updates the ratio of the radio resources whose use is limited, to a value that is a predetermined subtraction step smaller than the latest ratio of the radio resources whose use is limited when the relative delay index is smaller than a second threshold of the relative delay index.

19. The base station according to claim 17, wherein the priority resource requesting unit calculates the ratio of the radio resources whose use is limited using the first delay index, the second delay index and a difference between or a ratio of the first delay index and the second delay index.

20. The base station according to claim 17, wherein the load is a band use ratio.

21. The base station according to claim 17, wherein the load is a number of terminals.

22. The base station according to claim 17, wherein the load is a delay time of the terminal.

23. The base station according to claim 17, wherein the load is a throughput of the terminal.

24. A radio resource setting system that, when there are a first communication area managed by a first base station and a second communication area including at least part of the first communication area and managed by a second base station, sets radio resources that the first and second base stations can use for wireless communication with a terminal, wherein the radio resource setting system is configured to:
    obtain loads of the first communication area and the second communication area;
    calculate a first delay index of the first communication area using the load of the first communication area;
    calculate using the load of the second communication area a second delay index of the second communication area in case where the radio resources whose use is limited in the second communication area have been set;

calculate a ratio of the radio resources whose use is limited in the second communication area based on the first delay index and the second delay index; and set the radio resources whose use is limited in the second communication area using the ratio of the radio resources whose use is limited.

25. A non-transitory computer readable medium having stored thereon a program that is executed by a computer of a base station that performs wireless communication with a terminal in a second communication area that is at least one of a neighboring communication area of a first communication area or a communication area including part of the first communication area, the program causing the computer to execute:

obtaining a load of the second communication area;

calculating a first delay index of the first communication area using a load of the first communication area notified from an other base station that manages the first communication area;

calculating using the load of the second communication area a second delay index of the second communication area in case where the radio resources whose use is limited in the second communication area have been set; and calculating a ratio of the radio resources whose use is limited in the second communication area based on the first delay index and the second delay index.

\* \* \* \* \*